(12) United States Patent
Zhang et al.

(10) Patent No.: US 12,302,399 B2
(45) Date of Patent: May 13, 2025

(54) RANDOM ACCESS CHANNEL OCCASIONS AND RESOURCES FOR INTERFERENCE MITIGATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 17/571,270

(22) Filed: Jan. 7, 2022

(65) Prior Publication Data
US 2023/0224970 A1 Jul. 13, 2023

(51) Int. Cl.
*H04W 74/0833* (2024.01)
*H04W 72/542* (2023.01)

(52) U.S. Cl.
CPC ..... *H04W 74/0833* (2013.01); *H04W 72/542* (2023.01)

(58) Field of Classification Search
CPC ........... H04W 74/0833; H04W 72/542; H04W 72/541; H04J 11/0036
See application file for complete search history.

(56) References Cited

U.S. PATENT DOCUMENTS

| | | | |
|---|---|---|---|
| 2017/0026073 A1* | 1/2017 | Liu | H04B 1/50 |
| 2019/0223044 A1* | 7/2019 | Qin | H04W 76/15 |
| 2019/0274053 A1* | 9/2019 | Wang | H04W 16/10 |
| 2019/0349945 A1* | 11/2019 | Yeh | H04L 5/0073 |
| 2020/0351690 A1* | 11/2020 | Zhu | H04B 17/318 |
| 2021/0243738 A1* | 8/2021 | Islam | H04W 72/23 |

(Continued)

FOREIGN PATENT DOCUMENTS

| | | |
|---|---|---|
| EP | 3678441 A1 | 7/2020 |
| WO | WO-2019050544 A1 | 3/2019 |

(Continued)

OTHER PUBLICATIONS

International Search Report and Written Opinion—PCT/US2022/080253—ISA/EPO—Mar. 21, 2023.

*Primary Examiner* — Sun Jong Kim
(74) *Attorney, Agent, or Firm* — Holland & Hart LLP

(57) ABSTRACT

Methods, systems, and devices for wireless communications are described. A first user equipment (UE) may receive a message scheduling a first resource for a downlink communication between a base station and the first UE, the first resource overlapping with a second resource for a random access channel (RACH) occasion (RO) for use by one or more second UEs. The first UE may receive the downlink communication over the first resource based on receiving the message, where the first resource is full-duplexed with the second resource of the RO and may transmit, over a third resource, an indication of cross link interference between a RACH message transmitted over the second resource and the downlink communication. The first UE may receive a second downlink communication over a fourth resource based at least in part on transmitting the indication.

29 Claims, 22 Drawing Sheets

(56) References Cited

U.S. PATENT DOCUMENTS

| | | | |
|---|---|---|---|
| 2022/0140959 A1* | 5/2022 | Pedersen | H04W 72/541 370/329 |
| 2022/0173829 A1* | 6/2022 | Huang | H04L 5/0082 |
| 2022/0279336 A1* | 9/2022 | You | H04W 72/542 |
| 2023/0189315 A1* | 6/2023 | Haustein | H04W 24/02 370/252 |

FOREIGN PATENT DOCUMENTS

| | | |
|---|---|---|
| WO | WO-2021092820 A1 * | 5/2021 |
| WO | WO-2021226824 A1 | 11/2021 |

* cited by examiner

RANDOM ACCESS CHANNEL OCCASIONS AND RESOURCES FOR INTERFERENCE MITIGATION

FIELD OF TECHNOLOGY

The following relates to wireless communications, including random access channel (RACH) occasions (ROs) and resources for interference mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A first communication device (e.g., a base station, a UE) may support wireless communications while operating in a full-duplex mode, in which the first communication device may simultaneously transmit and receive wireless communications. For example, the first communication device may transmit or receive uplink communications and transmit or receive downlink communications at a same time and using the same frequency bands while operating in the full-duplex mode. In some examples, when operating in the full-duplex mode, the first communication device may be susceptible to interference (also referred to as crosslink interference (CLI)) from a second communication device (e.g., a second UE or a second base station). This interference may be due to the second communication device communicating (e.g., transmitting or receiving wireless communications) at the same time that the first communication device is transmitting or receiving wireless communication.

SUMMARY

The described techniques relate to improved methods, systems, devices, and apparatuses that support random access channel (RACH) occasions (ROs) and resources for interference mitigation. Generally, the described techniques provide for crosslink interference (CLI) mitigation. In some examples, full-duplex communications at a base station may include one or more downlink communications full duplexed with one or more ROs. In one example, a first UE may support a first set of communication protocols (e.g., more signaling, more recently introduced signaling, 5G, new signaling) and a second UE (e.g., a random access communication device) may support a second set of communication protocols (e.g., older, legacy, 4G signaling). Interference mitigation techniques for some full duplexed communications may be implemented by a UE that supports the more advanced signaling (e.g., 5G UE).

For example, a first UE may implement signaling to mitigate interference in full-duplexed communications when a second UE may not be capable of implementing signaling to mitigate the interference. In such examples, to reduce or eliminate interference, the first UE may report high interference detected in ongoing downlink reception to avoid potential future CLI from the second UE. The report may be transmitted to the base station via a control channel that also carries feedback and/or scheduling requests. Based on receiving the report, the base station may avoid using full-duplex downlink occasions or may update transmission parameters for configured full-duplex downlink transmissions, among other examples for mitigating CLI.

In some other examples, the downlink UE and the random access occasion UE device may both support the first set of communication protocols (e.g., more recently introduced, 5G, new signaling) and other devices which may support the second set of communication protocols (e.g., older, legacy, 4G signaling). In such examples, interference mitigation may be coordinated between the two UEs. For example, the first UE may detect high CLI and may indicate to the second UE to refrain from using full-duplex ROs, where the indication is transmitted via a pre-configured resource known by both the first device and the second device. The second device may avoid using the full-duplex ROs for an amount of time to avoid the interference, among other mitigation examples.

A method for wireless communication at a first user equipment (UE) is described. The method may include receiving a message scheduling a first resource for a downlink communication between a base station and the first UE, the first resource overlapping with a second resource for a random access channel occasion for use by one or more second UEs, receiving the downlink communication over the first resource based on receiving the message, transmitting, over a third resource, an indication of cross link interference between a random access channel message transmitted over the second resource and the downlink communication communicated to at least one UE of the one or more second UEs, and receiving a second downlink communication over a fourth resource based on transmitting the indication.

An apparatus for wireless communication at a first UE is described. The apparatus may include a processor, memory coupled with the processor, and instructions stored in the memory. The instructions may be executable by the processor to cause the apparatus to receive a message scheduling a first resource for a downlink communication between a base station and the first UE, the first resource overlapping with a second resource for a random access channel occasion for use by one or more second UEs, receive the downlink communication over the first resource based on receiving the message, transmit, over a third resource, an indication of cross link interference between a random access channel message transmitted over the second resource and the downlink communication communicated to at least one UE of the one or more second UEs, and receive a second downlink communication over a fourth resource based on transmitting the indication.

Another apparatus for wireless communication at a first UE is described. The apparatus may include means for receiving a message scheduling a first resource for a downlink communication between a base station and the first UE, the first resource overlapping with a second resource for a random access channel occasion for use by one or more second UEs, means for receiving the downlink communication over the first resource based on receiving the message, means for transmitting, over a third resource, an indication of cross link interference between a random access channel message transmitted over the second resource and the downlink communication communicated to at least one UE of the one or more second UEs, and means for receiving a second downlink communication over a fourth resource based on transmitting the indication.

A non-transitory computer-readable medium storing code for wireless communication at a first UE is described. The code may include instructions executable by a processor to receive a message scheduling a first resource for a downlink communication between a base station and the first UE, the first resource overlapping with a second resource for a random access channel occasion for use by one or more second UEs, receive the downlink communication over the first resource based on receiving the message, transmit, over a third resource, an indication of cross link interference between a random access channel message transmitted over the second resource and the downlink communication communicated to at least one UE of the one or more second UEs, and receive a second downlink communication over a fourth resource based on transmitting the indication.

In some examples of the method, apparatuses, and non-transitory computer-readable medium described herein, the first resource for the downlink communication may be full duplexed with the second resource of the random access channel occasion.

Some examples of the method, apparatuses, and non-transitory computer-readable medium described herein may further include operations, features, means, or instructions for detecting that the cross link interference between the random access channel message transmitted over the second resource and the downlink communication communicated to the at least one UE of the one or more second UEs satisfies a threshold, where transmitting the indication may be based on detecting that the cross link interference satisfies the threshold.

Some examples of the method, apparatuses, and non-transitory computer-readable medium described herein may further include operations, features, means, or instructions for receiving, as part of the message, a second indication of the third resource used to transmit the indication, where transmitting the indication may be based on receiving the second indication of the third resource.

Some examples of the method, apparatuses, and non-transitory computer-readable medium described herein may further include operations, features, means, or instructions for identifying a second UE of the one or more second UEs that may be causing the cross link interference with the downlink communication, where the indication may be transmitted to the second UE based on identifying the second UE.

In some examples of the method, apparatuses, and non-transitory computer-readable medium described herein, the indication of the cross link interference causes a second UE of the one or more second UEs to refrain from communicating over at least one instance of the random access channel occasion that occurs within a time threshold after the second resource for the random access channel occasion.

In some examples of the method, apparatuses, and non-transitory computer-readable medium described herein, the cross link interference may be interference caused by a full duplex configuration between the downlink communication and an uplink communication transmitted over the random access channel occasion.

In some examples of the method, apparatuses, and non-transitory computer-readable medium described herein, the indication includes a destination UE identifier associated with the one or more second UEs.

In some examples of the method, apparatuses, and non-transitory computer-readable medium described herein, the third resource may be configured for downlink communications with a high-priority.

In some examples of the method, apparatuses, and non-transitory computer-readable medium described herein, the third resource includes a sidelink communication resource.

In some examples of the method, apparatuses, and non-transitory computer-readable medium described herein, the third resource corresponds to a first communication beam and a second third resource corresponds to a second communication beam.

A method for wireless communication at a first UE is described. The method may include receiving a message scheduling a first resource for a downlink communication between a base station and the first UE, the first resource overlapping with a second resource for a random access channel occasion for use by one or more second UEs, where the first resource for the downlink communication is full duplexed with the second resource for the random access channel occasion, receiving the downlink communication over the first resource based on receiving the message, and transmitting, to the base station over a third resource, an indication of cross link interference between a random access channel message transmitted over the second resource and the downlink communication received from the base station.

An apparatus for wireless communication at a first UE is described. The apparatus may include a processor, memory coupled with the processor, and instructions stored in the memory. The instructions may be executable by the processor to cause the apparatus to receive a message scheduling a first resource for a downlink communication between a base station and the first UE, the first resource overlapping with a second resource for a random access channel occasion for use by one or more second UEs, where the first resource for the downlink communication is full duplexed with the second resource for the random access channel occasion, receive the downlink communication over the first resource based on receiving the message, and transmit, to the base station over a third resource, an indication of cross link interference between a random access channel message transmitted over the second resource and the downlink communication received from the base station.

Another apparatus for wireless communication at a first UE is described. The apparatus may include means for receiving a message scheduling a first resource for a downlink communication between a base station and the first UE, the first resource overlapping with a second resource for a random access channel occasion for use by one or more second UEs, where the first resource for the downlink communication is full duplexed with the second resource for the random access channel occasion, means for receiving the downlink communication over the first resource based on receiving the message, and means for transmitting, to the base station over a third resource, an indication of cross link interference between a random access channel message transmitted over the second resource and the downlink communication received from the base station.

A non-transitory computer-readable medium storing code for wireless communication at a first UE is described. The code may include instructions executable by a processor to receive a message scheduling a first resource for a downlink communication between a base station and the first UE, the first resource overlapping with a second resource for a random access channel occasion for use by one or more second UEs, where the first resource for the downlink communication is full duplexed with the second resource for the random access channel occasion, receive the downlink communication over the first resource based on receiving the message, and transmit, to the base station over a third resource, an indication of cross link interference between a random access channel message transmitted over the second resource and the downlink communication received from the base station.

Some examples of the method, apparatuses, and non-transitory computer-readable medium described herein may further include operations, features, means, or instructions for detecting whether the cross link interference between the random access channel message transmitted over the second resource and the downlink communication received from the base station satisfies a threshold based on receiving the downlink communication, where transmitting the indication may be based on determining whether the cross link interference satisfies the threshold.

Some examples of the method, apparatuses, and non-transitory computer-readable medium described herein may further include operations, features, means, or instructions for monitoring for a second downlink communication communicated over one or more resources that occur within a time threshold after the second resource for the random access channel occasion based on detecting that the cross link interference fails to satisfy the threshold.

Some examples of the method, apparatuses, and non-transitory computer-readable medium described herein may further include operations, features, means, or instructions for refraining from monitoring for a second downlink communication communicated over one or more resources that occur within a time threshold after the second resource for the random access channel occasion based on detecting that the cross link interference satisfies the threshold.

Some examples of the method, apparatuses, and non-transitory computer-readable medium described herein may further include operations, features, means, or instructions for receiving a second indication from the base station to refrain from monitoring for a second downlink communication communicated over one or more resources that occur within a time threshold after the second resource for the random access channel occasion based on transmitting the second indication.

Some examples of the method, apparatuses, and non-transitory computer-readable medium described herein may further include operations, features, means, or instructions for receiving, as part of the indication, a second indication of the third resource used to communicate the second indication of the cross link interference.

In some examples of the method, apparatuses, and non-transitory computer-readable medium described herein, the indication may be transmitted via physical uplink control channel (PUCCH) and the PUCCH includes a feedback indication or a scheduling request, or both.

A method for wireless communication at a base station is described. The method may include transmitting, to a first UE, a message scheduling a first resource for a downlink communication between the base station and the first UE, the first resource overlapping with a second resource for a random access channel occasion for use by one or more second UEs, where the first resource for the downlink communication is full duplexed with the second resource of the random access channel occasion, transmitting the downlink communication over the first resource based on transmitting the message, and receiving, from the first UE over a third resource, an indication of cross link interference between a random access channel message transmitted over the second resource and the downlink communication transmitted by the base station.

An apparatus for wireless communication at a base station is described. The apparatus may include a processor, memory coupled with the processor, and instructions stored in the memory. The instructions may be executable by the processor to cause the apparatus to transmit, to a first UE, a message scheduling a first resource for a downlink communication between the base station and the first UE, the first resource overlapping with a second resource for a random access channel occasion for use by one or more second UEs, where the first resource for the downlink communication is full duplexed with the second resource of the random access channel occasion, transmit the downlink communication over the first resource based on transmitting the message, and receive, from the first UE over a third resource, an indication of cross link interference between a random access channel message transmitted over the second resource and the downlink communication transmitted by the base station.

Another apparatus for wireless communication at a base station is described. The apparatus may include means for transmitting, to a first UE, a message scheduling a first resource for a downlink communication between the base station and the first UE, the first resource overlapping with a second resource for a random access channel occasion for use by one or more second UEs, where the first resource for the downlink communication is full duplexed with the second resource of the random access channel occasion, means for transmitting the downlink communication over the first resource based on transmitting the message, and means for receiving, from the first UE over a third resource, an indication of cross link interference between a random access channel message transmitted over the second resource and the downlink communication transmitted by the base station.

A non-transitory computer-readable medium storing code for wireless communication at a base station is described. The code may include instructions executable by a processor to transmit, to a first UE, a message scheduling a first resource for a downlink communication between the base station and the first UE, the first resource overlapping with a second resource for a random access channel occasion for use by one or more second UEs, where the first resource for the downlink communication is full duplexed with the second resource of the random access channel occasion, transmit the downlink communication over the first resource based on transmitting the message, and receive, from the first UE over a third resource, an indication of cross link interference between a random access channel message transmitted over the second resource and the downlink communication transmitted by the base station.

Some examples of the method, apparatuses, and non-transitory computer-readable medium described herein may further include operations, features, means, or instructions for transmitting, to the first UE over one or more resources that occur within a time threshold after the second resource for the random access channel occasion, a second downlink communication based on the indication of the cross link interference indicating that the cross link interference fails to satisfy a threshold.

Some examples of the method, apparatuses, and non-transitory computer-readable medium described herein may further include operations, features, means, or instructions for refraining from transmitting, to the first UE over one or more resources within a time threshold that occur after the second resource for the random access channel occasion, a second downlink communication based on the indication of the cross link interference indicating that the cross link interference satisfies a threshold.

Some examples of the method, apparatuses, and non-transitory computer-readable medium described herein may further include operations, features, means, or instructions for transmitting a second indication to indicate to the first UE to refrain from monitoring for a second downlink communication communicated over one or more resources that occur within a time threshold after the second resource for the random access channel occasion based on receiving the indication.

Some examples of the method, apparatuses, and non-transitory computer-readable medium described herein may further include operations, features, means, or instructions for transmitting, as part of the message, a second indication of the third resource used to communicate the indication of the cross link interference.

In some examples of the method, apparatuses, and non-transitory computer-readable medium described herein, the indication may be received via PUCCH and the PUCCH includes a feedback indication or a scheduling request, or both.

DETAILED DESCRIPTION

Figure 1:
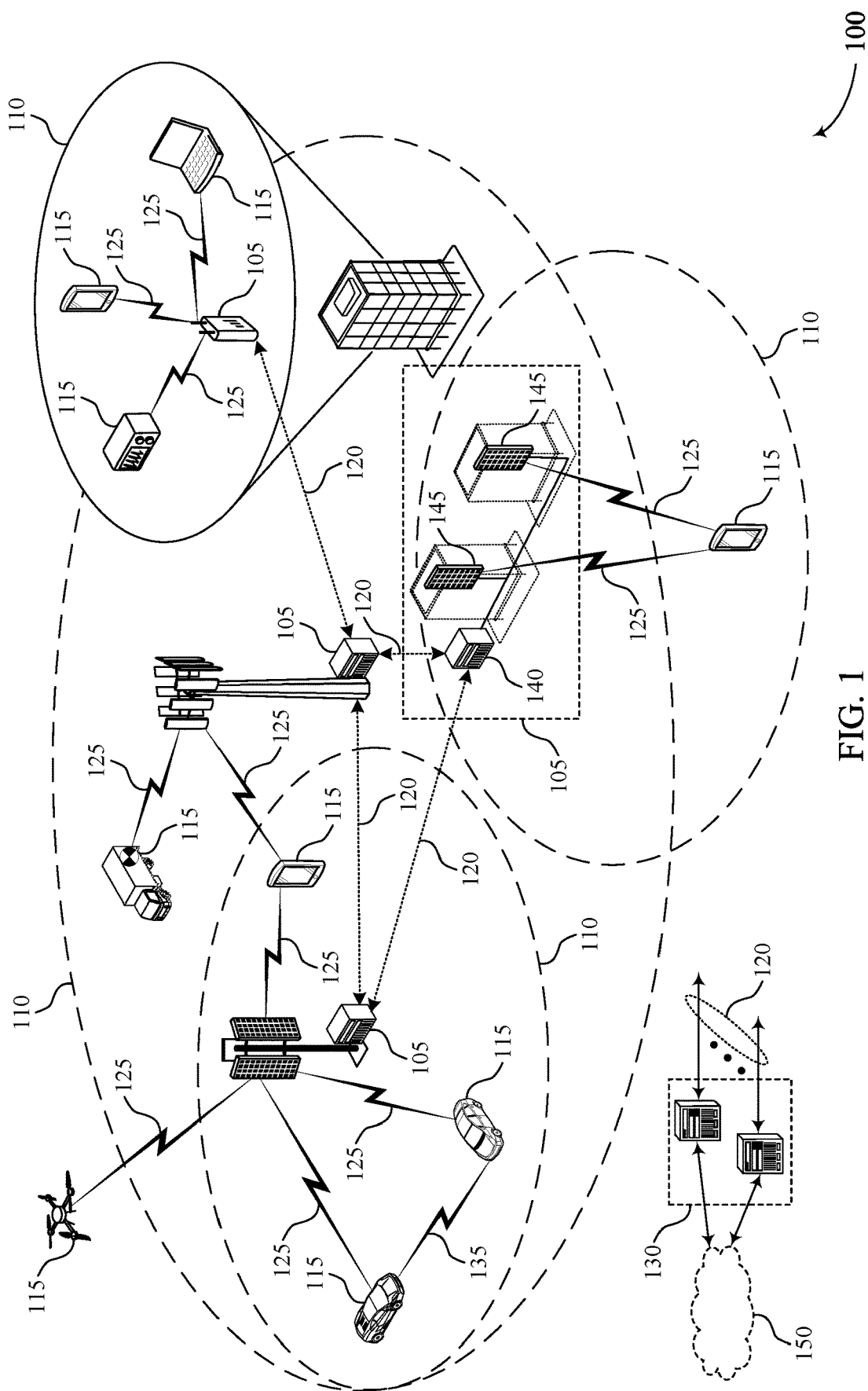
FIG. 1 illustrates an example of a wireless communications system that supports random access channel (RACH) occasions (ROs) and resources for interference mitigation in accordance with aspects of the present disclosure.

A wireless communications system may include communication devices, such as a user equipment (UE) or a base station, that may support multiple radio access technologies. Examples of radio access technologies include 4G systems, such as LTE systems, and 5G systems, which may be referred to as NR systems. The communication devices may support wireless communication while operating in a half-duplex mode or a full-duplex mode. For example, a communication device (e.g., a base station or a UE) may support wireless communications while operating in a full-duplex mode in which the communication device may simultaneously transmit and receive wireless communications using the same time resources (e.g., symbol, slot, subframe, etc.) and the same frequency resources (e.g., frequency subband). That is, the communication device (such as a base station) may receive uplink communications and transmit downlink communications at a same time while operating in the full-duplex mode. Such situations may create interference with other communication devices. In some examples, a first UE (e.g., a full-duplex configured UE) may be susceptible to interference (also referred to as crosslink interference (CLI)) caused by communications at a second UE. The second UE may communicate (e.g., transmit or receive wireless communications) at a same time that the first UE is transmitting or receiving wireless communication and may cause interference at the first UE. Additionally, a full-duplex base station may be configured with full-duplex capabilities and as such, random access channel (RACH) occasions (ROs) with the second UE may be multiplexed with downlink signals to the first UE on the same symbols to reduce latency. The first UE may attempt to receive downlink communications from the full-duplex base station while the second UE is attempting to perform a RACH procedure with the full-duplex base station during one or more ROs, the interference from the second UE may impact the reception of the downlink communications at the first UE.

In some examples, the first UE (e.g., the downlink UE) may support a first set of wireless communication protocols (e.g., more signaling, more recently introduced signaling, 5G signaling, new signaling) and a second device (e.g., the random access UE) may support a second set of wireless communication protocols (e.g., legacy signaling, older signaling, 4G signaling). Interference mitigation techniques for some full duplexed communications may be implemented by a UE that supports the more advanced signaling (e.g., 5G UE).

In some examples, the first UE may implement signaling to mitigate interference in full-duplexed communications when the second UE is configured with the second set of communication protocols (e.g., may not be capable of implementing signaling to mitigate the interference). In such examples, to reduce or eliminate interference, the first UE (e.g., the downlink UE) may report, to the base station, high interference detected in ongoing downlink reception to avoid potential future CLI from the second UE (e.g., the RACH UE). The interference indication may be transmitted to the base station via a control channel that also carries feedback and/or scheduling requests. Based on receiving the indication, the base station may avoid using full-duplex downlink occasions or may update transmission parameters for configured full-duplex downlink transmissions. The base station may identify the second UE based on a preamble received in the indication (e.g., from the first UE), and may avoid scheduling downlink communications with the first UE that are full-duplexed with ROs that may be used by the second UE. In some examples, the report may also implicitly cancel configured full-duplex downlink occasions for a duration of time (e.g., a time threshold, a quantity of symbols or other time resource). Alternatively, full-duplex downlink occasions may be implicitly moved to backup occasions (e.g., preconfigured backup occasions) to reduce potential interference. In some cases, the backup downlink occasions may be half-duplexed.

In some other examples, the downlink UE (e.g., the first UE) and the random access occasion UE may both support the first set of communication protocols (e.g., more recently introduced, 5G, new signaling) than some other devices which may support the second set of communication protocols (e.g., legacy, less, 4G signaling) and interference mitigation may be coordinated between the two UEs. For example, the first device UE detect high CLI and may indicate to the second UE to refrain from using full-duplex ROs, where the indication is transmitted via a resource (e.g., a preconfigured resource, a cell-specific UE coordination resource) known by both the first UE and the second UE. Accordingly, the second UE may avoid using the full-duplex ROs for an amount of time. In some examples, the resource may be configured for high priority devices or may be configured for other categories of UEs or both. In some cases, if sidelink is supported between the first UE and the second UE, the resource may be a sidelink resource for transmitting the CLI indicator between the first UE and the second UE. In some cases, the indication may be broadcast during the resources and in some cases, may indicate by which device the interference is caused such that the interfering device may avoid using the overlapping resources while other devices may continue to use the overlapping resources.

Aspects of the disclosure are initially described in the context of wireless communications systems. Aspects of the disclosure are then described in the context of scheduling configurations and a process flow diagram. Aspects of the disclosure are further illustrated by and described with reference to apparatus diagrams, system diagrams, and flowcharts that relate to ROs and resources for interference mitigation.

FIG. 1 illustrates an example of a wireless communications system 100 that supports ROs and resources for interference mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may support wireless communication while operating in a half-duplex mode or a full-duplex mode. In some cases, the base station 105 and the UE 115 may support wireless communication, while operating in the half-duplex mode or the full-duplex mode, in various radio frequency spectrum ranges, such as a frequency range 2 (FR2). When operating in the half-duplex mode, the base station 105 and the UE 115 may separately (e.g., at different times) transmit wireless communication (e.g., uplink signals, downlink signals) or receive wireless communication (e.g., uplink signals, downlink signals). Alternatively, when operating in the full-duplex mode, the base station 105 and the UE 115 may simultaneously (e.g., at the same time) transmit wireless communication (e.g., uplink signals, downlink signals) and receive wireless communication (e.g., uplink signals, downlink signals).

The base station 105 and the UE 115 may support communication of uplink signals using one panel (e.g., an antenna panel, an antenna port) and another panel for communication of downlink signals. For example, the base station 105 may receive uplink signals using one panel and transmit downlink signals using another panel. Similarly, the UE 115 may transmit uplink signals using one panel and receive downlink signals using another panel. In some cases, the wireless communication while operating in the full-duplex mode may depend on a capability of the base station 105 or the UE 115. Additionally, to support full-duplex operation by the base station 105 or the UE 115 may be based on a beam separation between beams for uplink signals and beams for downlink signals. In some other cases, to support full-duplex operation by the base station 105 or the UE 115 may be based on self-interference between uplink signals and downlink signals at the base station 105 or the UE 115. In other cases, to support full-duplex operation by the base station 105 or the UE 115 may be based on a clutter echo between uplink signals and downlink signals.

The base station 105 and the UE 115 may support various random access procedures. Examples of random access procedures may include a four-step RACH procedure (4-step RACH procedure) and a two-step RACH procedure (2-step RACH procedure). A random access procedure may occur over a set of occasions (also referred to as ROs). A set of occasions may include one or more occasions. In the wireless communications system 100, an occasion may be a resource in one or both of a time domain or a frequency domain, over which the base station 105 and the UE 115 may perform a random access procedure (e.g., a RACH procedure). An RO may support half-duplex communications or full-duplex communications. For example, one RO may support half-duplex communications, while another RO may support full-duplex communications.

In some cases, one or more ROs may overlap in a time domain with one or more downlink occasions (DO) associated with downlink communications (e.g., downlink signals, synchronization signal blocks (SSBs), semi-persistent scheduled (SPS) communications) from the base station 105 to another UE 115. As described herein, an overlap may between an RO and a DO may refer to a partial overlap or a full overlap in a time domain. In some cases, the base station 105 may multiplex an RO with downlink signals associated with a DO for the other UE 115 that overlaps (e.g., on same symbols, such as OFDM symbols) with the RO to reduce a latency for the random access procedure between the base station 105 and the UE 115.

In some cases, due to the overlap, the UE 115 may be susceptible to interference (also referred to as CLI) from the other UE 115. In some examples, to reduce or eliminate interference (e.g., a CLI), the UE 115 may perform CLI measurement and CLI reporting associated with one or more downlink messages that may correspond to one or more CLI resources associated with the other UE 115. In some aspects, the UE 115 may be scheduled to receive downlink signals from the base station 105 and may perform CLI measurement and CLI reporting when receiving the downlink signals from the base station 105. In other aspects, the UE 115 and the other UE 115 may support coordination to mitigate CLI.

For example, when the downlink UE 115 supports a same radio access technology (e.g., supporting 5G) as the second UE 115 (e.g., also supporting 5G), the downlink UE 115 may receive a scheduling message (e.g., SPS signaling) scheduling a first resource for a downlink communication between the base station 105 and the downlink UE 115. In some examples, the first resource may overlap with a second resource allocated as a RACH occasion for use by the second UE 115. The downlink UE may receive the downlink communication over the first resource and may transmit, to the second UE 115, an indication of CLI between a RACH message transmitted over the second resource and the downlink communication communicated over a third resource, where the CLI indication is transmitted via a resource (e.g., a preconfigured resource, a cell-specific UE coordination resource) known by both the downlink UE 115 and the second UE 115. Accordingly, the second UE 115 may avoid using the full-duplex ROs for an amount of time. In some examples, the resource may be configured for high priority devices or may be configured for other categories of UEs or both. In some cases, if sidelink is supported between the downlink UE 115 and the second UE 115, the resource may be a sidelink resource for transmitting the CLI indicator. In some cases, the indication may be broadcast during the resources and in some cases, may indicate by which device the interference is caused such that the interfering device may avoid using the overlapping resources while other devices may continue to use the overlapping resources.

In some other examples, when the downlink UE 115 supports a different radio access technology (e.g., supporting 5G) than the second UE 115 (e.g., supporting 4G), the downlink UE 115 may receive a message scheduling a first resource for a downlink communication between the base station 105 and the downlink UE 115, the first resource overlapping with a second resource for a RO for use by the second UE 115, where the first resource for the downlink communication is full-duplexed with the second resource for the RO. The downlink UE 115 may receive the downlink communication over the first resource based on receiving the message and may transmit, to the base station 105 over a third resource, an indication of CLI between a RACH message transmitted over the second resource and the downlink communication received from the base station.

Based on receiving the CLI indication, the base station 105 may avoid using full-duplex downlink occasions or may update transmission parameters for configured full-duplex downlink transmissions. The base station 105 may identify the second UE 115 based on a preamble received in the indication (e.g., from the downlink UE 115), and may avoid scheduling full-duplex communications between the second UE 115 and the downlink UE 115. In some examples, the CLI indication may also cancel configured full-duplex downlink occasions for an amount of time (e.g., a time threshold, a number of symbols). Alternatively, full-duplex downlink occasions may be implicitly moved to backup occasions (e.g., preconfigured backup occasions) to reduce potential interference. As such, the downlink UE 115 may receive a second downlink communication over a fourth resource that is less likely to be affect by CLI based on transmitting the CLI indication.

By enabling the downlink UE 115 to support measuring and reporting CLI results, the downlink UE 115 may mitigate effects caused by CLI, among other examples, when performing communications with a base station 105 operating in a full-duplex communications mode.

Figure 2:
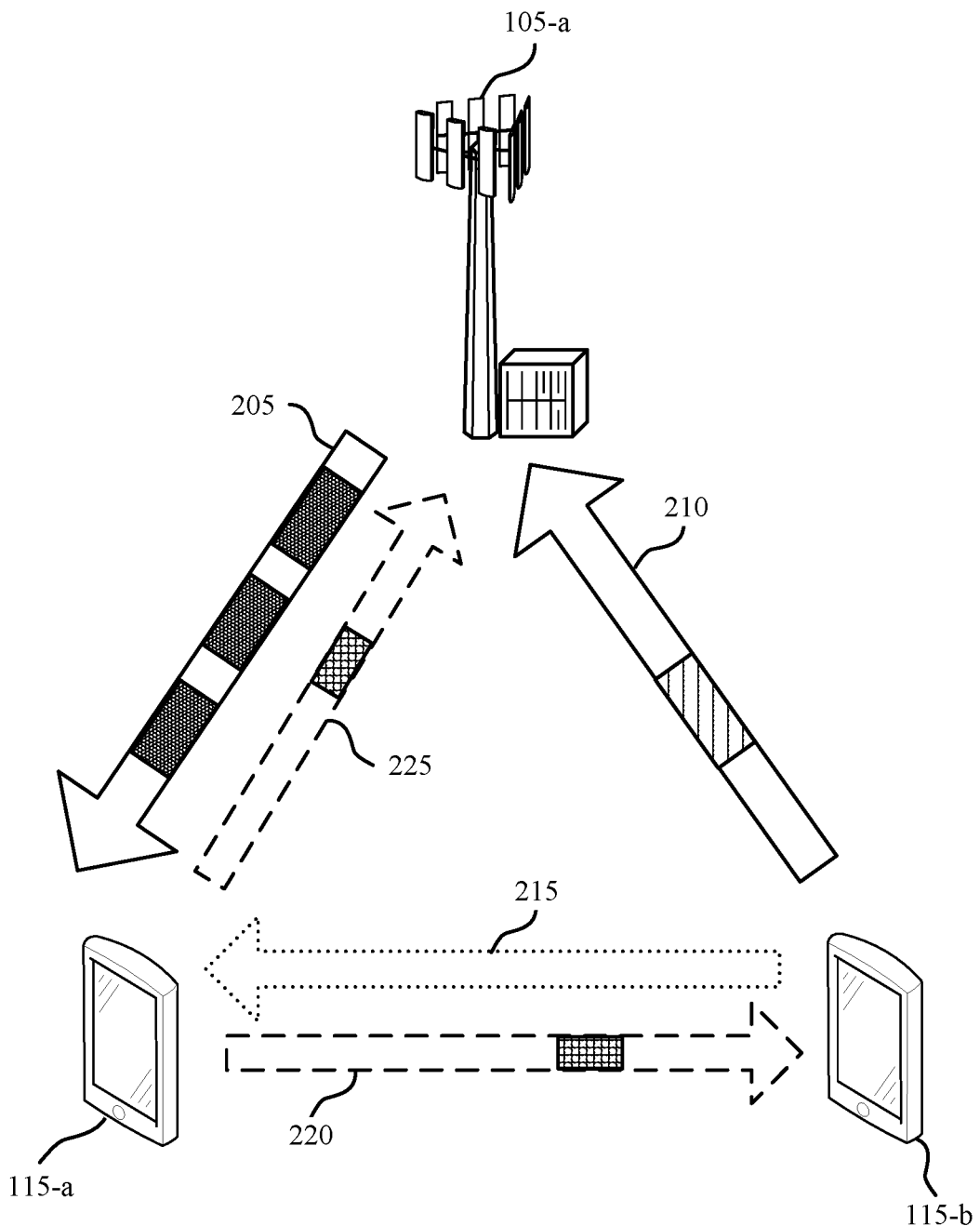
FIG. 2 illustrates an example of a wireless communications system that supports ROs and resources for interference mitigation in accordance with aspects of the present disclosure.

FIG. 2 illustrates an example of a wireless communications system 200 that supports ROs and resources for interference mitigation in accordance with aspects of the present disclosure. The wireless communications system 200 may implement aspects of the wireless communications system 100 or may be implemented by aspects of the wireless communications systems 100 as described with reference to FIG. 1. For example, the wireless communications system 200 may include a base station 105-*a*, a UE 115-*a*, and a UE 115-*b*, which may be examples of corresponding devices as described with reference to FIG. 1. In the example of FIG. 2, the base station 105-*a* may support wireless communication with the UE 115-*a* and the UE 115-*b* while operating in a full-duplex mode.

For example, the base station 105-*a* may simultaneously (e.g., at the same time) transmit downlink message 240 via communication link 205 to the UE 115-*a* using one antenna panel, and receive uplink messages, such as RACH message 230 over a RACH occasion via communication link 210 from the UE 115-*b* using another antenna panel. In some examples, the base station 105-*a* may support wireless communication with the UE 115-*a* and the UE 115-*b* using a beam or a beam pair. For example, the base station 105-*a* may concurrently transmit the downlink message 240 to the UE 115-*a* using a downlink beam, and receive the RACH message 230 from the UE 115-*b* using an uplink beam. Likewise, the UE 115-*a* may receive the downlink message 240 using a downlink beam, and the UE 115-*b* may receive the RACH message 230 using an uplink beam.

By enabling the base station 105-*a* or the UE 115-*a* or UE 115-*b* to support wireless communication using one or more of a beam or a beam pair when operating in the full-duplex mode, one or more of the base station 105-*a* or the UE 115-*a* or UE 115-*b* may alleviate self-interference problems. The wireless communications system 200 may also reduce latency (e.g., enabling the base station 105-*a* to transmit downlink message 240 during one or more uplink RACH occasions), increased spectrum efficiency (e.g., increased efficiency per cell, increased efficiency for the base station 105-*a*), among other examples by enabling one or more of the base station 105-*a* to support wireless communication using the full-duplex mode.

The base station 105-*a*, the UE 115-*a*, and the UE 115-*b* may communicate over communication links 205 and 210, which may be examples of communication links 125 as described with reference to FIG. 1 and sidelink 220 which may be an example of a D2D communication link 135 as described with reference to FIG. 1.

The base station 105-*a*, the UE 115-*a*, and the UE 115-*b* may support wireless communication while operating in a full-duplex mode. In some cases, when in the full-duplex mode, the UE 115-*a* may be susceptible to interference from the UE 115-*b*. For example, the UE 115-*a* may be susceptible to CLI 215 from the UE 115-*b*. In some cases, when the UE 115-*b* is attempting to perform a RACH procedure during a RO with the base station 105-*a*, the interference from the UE 115-*b* may impact downlink message 240 transmitted to the UE 115-*a*. To mitigate interference (e.g., the CLI 215) between communications that are full duplexed, the UE 115-*a* may support CLI measurement and CLI reporting.

For example, the UE 115-*a* (e.g., which may be an example of a downlink UE) may support a first radio access technology or a first set of wireless communication protocols (e.g., more signaling, more recently introduced signaling, 5G signaling, new signaling) and the UE 115-*b* (e.g., which may be an example of a random access UE) may support a second radio access technology or a second set of wireless communication protocols (e.g., legacy signaling, older signaling, 4G signaling). Interference mitigation techniques for some full duplexed communications may be implemented by a UE that supports the first radio access technology. For example, the UE 115-*a* may transmit signaling to mitigate interference in full-duplexed communications when the UE 115-*b* is configured with the second radio access technology (e.g., may not be capable of implementing signaling to mitigate the interference). In such examples, to reduce or eliminate interference, the UE 115-*a* (e.g., the downlink UE) may report, to the base station, high interference detected in ongoing downlink reception (e.g., of downlink messages 240) to avoid potential future CLI 215 from the UE 115-*b* (e.g., the RACH UE) including the CLI indication 235 via communications link 225.

The CLI indication 235 may be transmitted to the base station 105-*a* via a control channel that also carries feedback and/or scheduling requests. Based on receiving the indication, the base station 105-*a* may avoid using full-duplex downlink occasions or may update transmission parameters for configured full-duplex downlink transmissions. The base station 105-*a* may identify the UE 115-*b* as the cause of the interference based on a preamble received in the interfering RACH message 230 (e.g., from the UE 115-*b*), and may avoid scheduling full-duplex communications with the UE 115-*a* and the UE 115-*b*. In some examples, the CLI indication 235 may implicitly cancel configured full-duplex downlink occasions for an amount of time (e.g., a time threshold, a number of symbols). Alternatively, full-duplex downlink occasions may be implicitly moved to backup occasions (e.g., preconfigured backup occasions) to reduce potential interference.

In some other examples, the downlink UE 115-*a* and the random access occasion UE 115-*b* may both support the first radio access technology or the first set of communication protocols (e.g., more recently introduced, 5G, new signaling) than some other devices which may support the second set of communication protocols (e.g., legacy, less, 4G signaling) and interference mitigation may be coordinated between the UE 115-*a* and the UE 115-*b*. For example, the UE 115-*a* may detect high CLI and may indicate to the UE 115-*b* to refrain from using full-duplex ROs, where the CLI indication 235 is transmitted via a resource (e.g., a preconfigured resource, a cell-specific UE coordination resource) known by both the UE 115-*a* and the UE 115-*b*. Accordingly, the UE 115-*b* may avoid using the full-duplex ROs for an amount of time. In some examples, the resource may be configured for high priority devices or may be configured other categories of UEs (e.g., including UE 115-*a*) or both. In some cases, if sidelink is supported between the UE 115-*a* and the UE 115-*b*, the resource may be a sidelink resource for transmitting the CLI indicator. In some cases, the CLI indication may be broadcast during the resource and in some cases, may indicate by which device the interference is caused such that the interfering device (e.g., which in the example of FIG. 2 may be the UE 115-*b*) may avoid using the overlapping resources while other devices may continue to use the overlapping resources.

Figure 3:
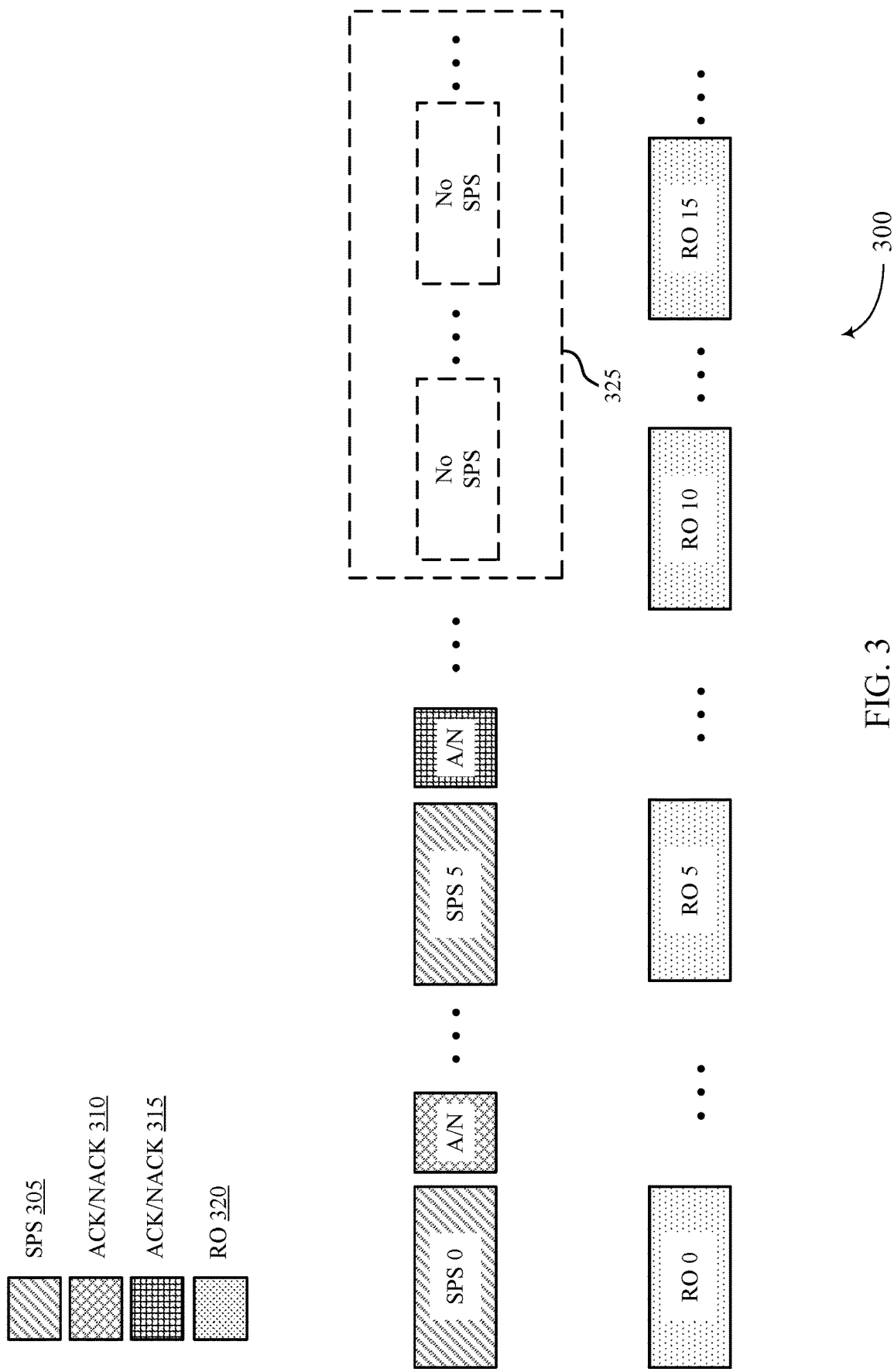
FIG. 3 illustrates an example of a resource schedule that supports ROs and resources for interference mitigation in accordance with aspects of the present disclosure.

FIG. 3 illustrates an example of a resource schedule 300 that supports ROs and resources for interference mitigation in accordance with aspects of the present disclosure. In some examples, the resource schedule 300 may implement or be implemented by aspects of the wireless communications system 100 and 200. For example, the resource schedule 300 may be implemented by a UE 115 or a base station 105 as described with reference to FIG. 1.

The resource schedule 300 may be implemented by a downlink UE (e.g., a UE 115 receiving downlink communications from a full-duplex base station) configured to communicate according to a first radio access technology and a RACH UE (e.g., a UE 115 transmitting one or more RACH messages to the full-duplex base station) configured to communicate according to a second radio access technology. In such examples, the downlink UE may be configured to perform one more or different signaling and/or operations than the RACH UE.

For example, the downlink UE may be configured to report (to the base station) high interference detected in ongoing downlink reception from a full-duplex base station to avoid potential future CLI from the RACH UE (e.g., interference caused by RACH retransmission, Msg3, or other RACH message). A CLI indication may be transmitted to the full-duplex base station via physical uplink control channel (PUCCH) which, in some examples, additionally may include HARQ ACK/NACK feedback, a scheduling request, or other uplink control information. Based on receiving the indication the base station may avoid using full-duplex downlink occasions or may update one or more parameters for configuring full-duplex downlink communications. In some examples, the base station may identify the RACH UE based on a preamble received in the RO associated with the CLI indication, and may avoid scheduling full-duplex communications between the RACH UE and the downlink UE. The transmitted CLI indication may also implicitly cancel configured full-duplex downlink occasions for a duration of time (e.g., X ms) after the RO associated with the CLI indication or a quantity of time resources (e.g., symbol, slot, subframe, frame, scheduled transmission occasion, or others) after the RO associated with the CLI. Additionally or alternatively, full-duplex downlink occasions may be implicitly moved or deferred to one or more backup occasions (e.g., preconfigured backup occasions).

For example, a downlink UE may be configured with one or more SPS resources 305 for monitoring and receiving a downlink communication from the full-duplex base station and may determine that one or more SPS resources 305 at least partially overlap with an RO 320 of the RACH UE. In such examples, the UE may measure the CLI associated with downlink message received during an SPS resource 305 and may transmit an ACK/NACK indication 310 based on whether the downlink communication was successfully received in a first SPS resource 305 (e.g., SPS 0) where the ACK/NACK indication may not include a CLI indication or may include an indication of low CLI based on the CLI associated with the downlink message remaining below a threshold which may indicate that the CLI is low and that additional measures to mitigate CLI may be avoided. The full-duplex base station, the downlink UE and the RACH UE may continue performing the full-duplex communications in such a way (e.g., where the downlink UE measures CLI associated with each overlapping occasion and reporting low or no CLI) until the downlink UE detects that the CLI associated with an overlapping occasion exceeds a threshold and transmits an ACK/NACK indication 315 including a CLI indication. In some such examples, the full-duplex base station may avoid transmitting over the SPS occasions for a period of time 325. In some examples, the full-duplex base station identify the RACH UE based on a preamble received in the reported RO 320, and may alternatively avoid scheduling full-duplex communications between the RACH UE and the reporting downlink UE for the period of time 325. In some examples, the CLI indication may implicitly cancel or defer configured full-duplex downlink occasions for the period of time 325.

Figure 4:
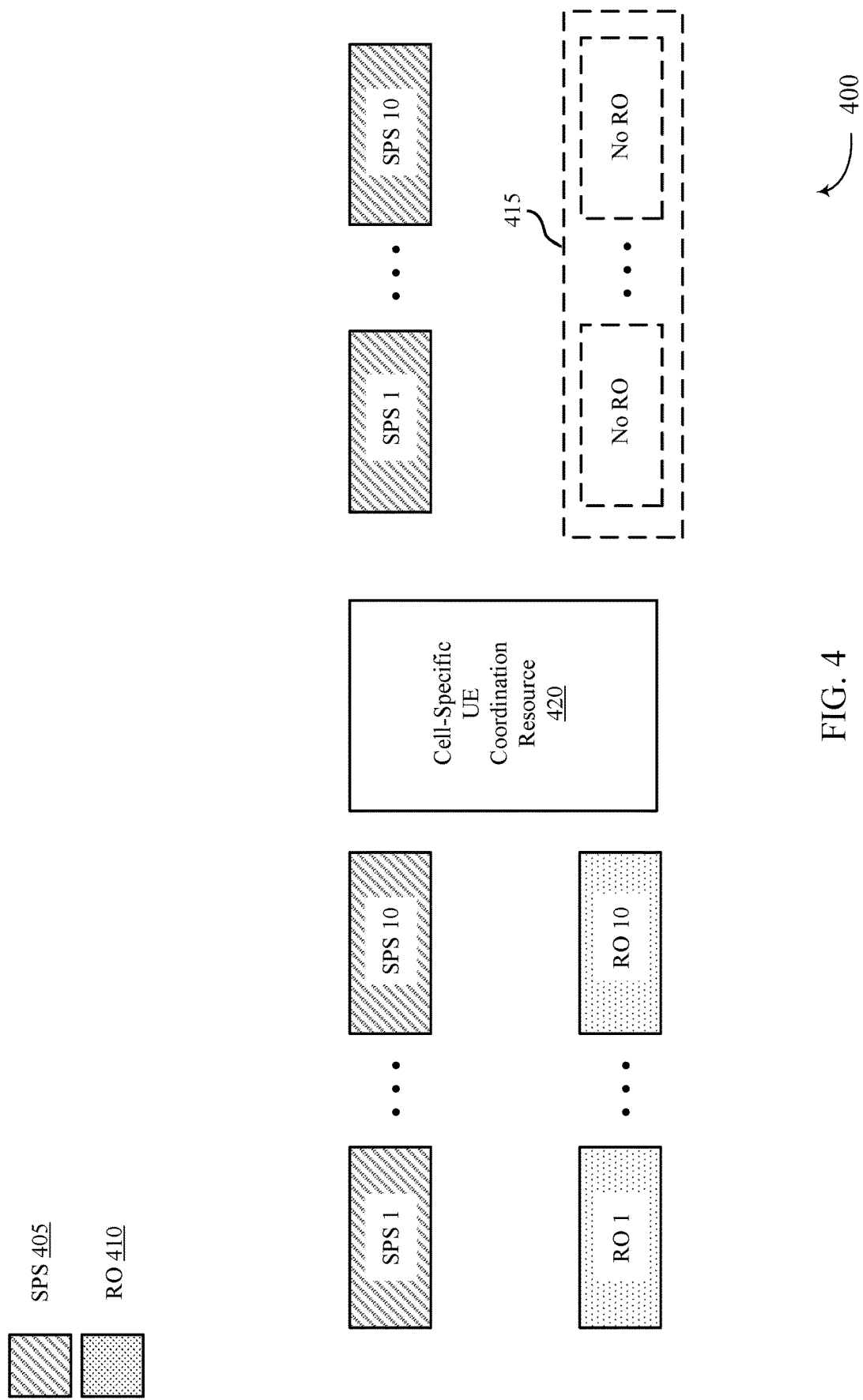
FIG. 4 illustrates an example of a resource schedule that supports ROs and resources for interference mitigation in accordance with aspects of the present disclosure.

FIG. 4 illustrates an example of a resource schedule 400 that supports ROs and resources for interference mitigation in accordance with aspects of the present disclosure. In some examples, the resource schedule 400 may implement or be implemented by aspects of the wireless communications system 100 and 200. For example, the resource schedule 400 may be implemented by a UE 115 or a base station 105 as described with reference to FIG. 1.

In the example of FIG. 4, the resource schedule 400 may be implemented by a downlink UE (e.g., a UE 115 receiving downlink communications from a full-duplex base station) configured to communicate according to a first radio access technology and a RACH UE (e.g., a UE 115 transmitting one or more RACH messages to the full-duplex base station) also configured to communicate according to the first radio access technology. In such examples, the downlink UE or the RACH UE, or both may be configured to perform CLI mitigation.

For example, the downlink UE and/or the RACH UE may initiate and execute coordination to mitigate CLI based on an intra-UE coordination procedure (e.g., a preconfigured coordination procedure). In some examples, upon detecting high CLI, the downlink UE may indicate to the RACH UE to refrain from full-duplex RACH occasion transmissions. In some examples, the indication may be transmitted via a configured resource (e.g., a cell specific UE coordination resource) that is known by both the downlink UE and the RACH UE. Accordingly, the RACH UE may avoid using (e.g., transmitting over) full-duplex RACH occasions for a period of time (e.g., period of time 415).

In some examples, the configured resource may be configured for high priority downlink UEs. That is, the downlink UE may transmit a CLI indication over the configured resource if a priority of an SPS resource affected by CLI is relatively high such that the RACH UE refrains from transmitting and the downlink UE receives the high-priority downlink message without CLI caused by the RACH UE. In some other examples, the configured resource may be configured for other categories of UEs or both. That is, the downlink UE may transmit a CLI indication over the configured resource regardless of whether a priority of an SPS resource affected by CLI is relatively high such that the RACH UE refrains from transmitting and the downlink UE receives the high-priority downlink message without CLI caused by the RACH UE regardless of the downlink priority. In some examples, sidelink communication may be supported between the downlink UE and RACH UE such that the configured resource may be a sidelink resource for transmitting and receiving the CLI indicator.

In some examples, the downlink UE may broadcast the CLI indicator in the configured resource. For example, the CLI indicator may include a specific preamble ID such that a RACH UE knows whether it is causing the high CLI and may avoid transmitting over the full-duplex RACH occasions accordingly while other RACH UE which were not indicated by the preamble ID can continue to use the full-duplex RACH occasions. In some examples, the downlink UE may perform beam sweeping for monitoring for the downlink message over an SPS resource and the full-duplex base station may configure more than one configured resources (e.g., one resource per beam) for broadcasting the CLI indicator.

For example, a downlink UE may be configured with one or more SPS resources 405 for monitoring and receiving a downlink communication from the full-duplex base station and may determine that one or more SPS resources 405 at least partially overlap with an RO 410 of the RACH UE. In such examples, the downlink UE may measure the CLI associated with a downlink message received during an SPS resource 405 and may determine that the CLI exceeds a threshold level of CLI. In some such examples, the downlink UE may transmit a Cell-Specific UE Coordination Resource 420 to the RACH UE and/or one or more other RACH UEs.

Accordingly, the RACH UE may avoid using the full-duplex ROs for an amount of time 415. In some examples, the resource may include a UE ID which may indicate that the CLI is caused by the RACH UE associated with the ID such that the RACH UE may avoid using the overlapping resources based on identifying that its RACH messages are causing the CLI at the downlink UE based on the UE ID.

Figure 5:
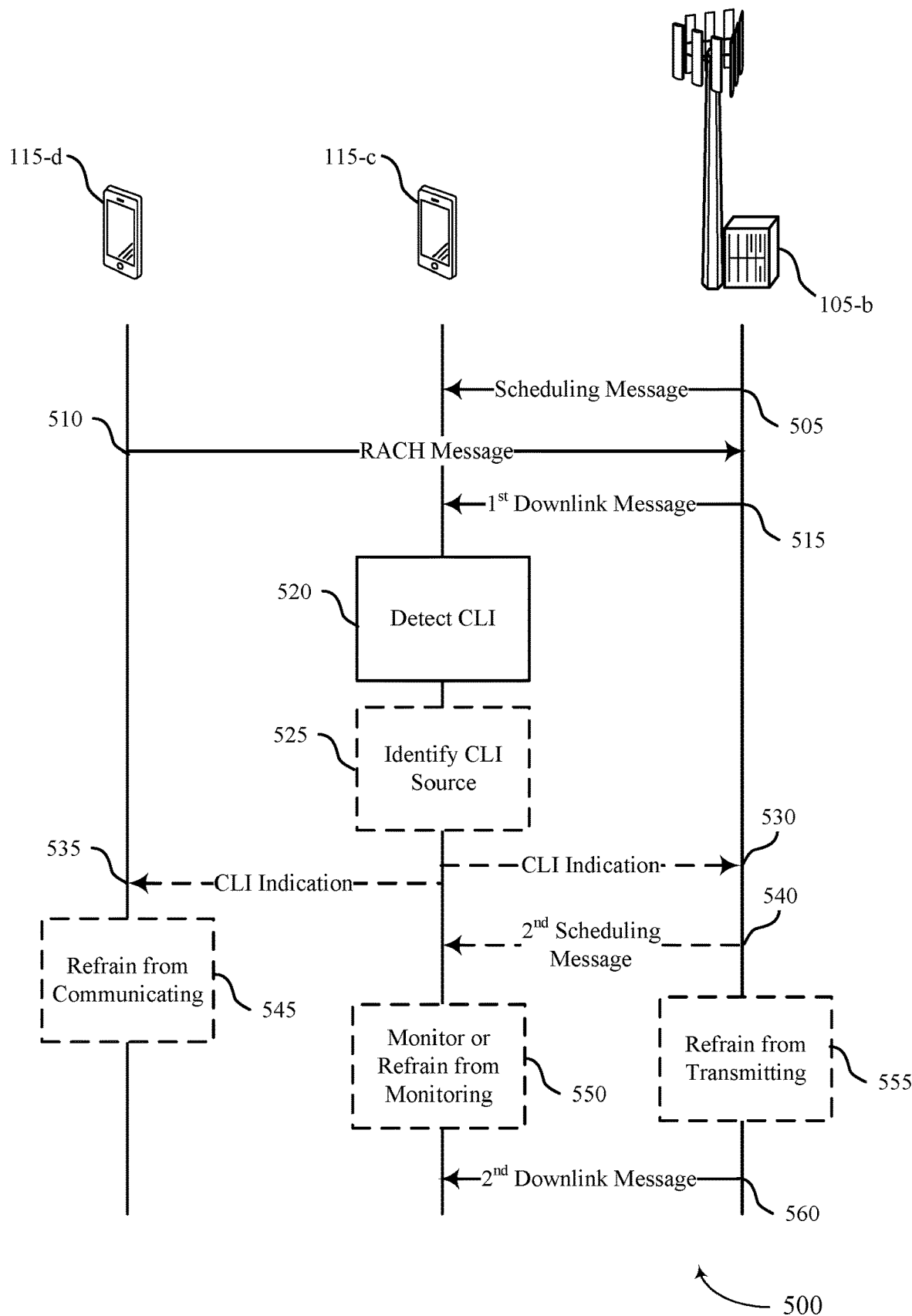
FIG. 5 illustrates an example of a process flow that supports ROs and resources for interference mitigation in accordance with aspects of the present disclosure.

FIG. 5 illustrates an example of a process flow 500 that supports ROs and resources for interference mitigation in accordance with aspects of the present disclosure. In some examples, the process flow 500 may implement or be implemented by aspects of the wireless communications system 100 and 200. For example, the process flow 500 may include a base station 105-b, a UE 115-c, and a UE 115-d, which may be examples of the corresponding devices described herein. In the following description of the process flow 500, the operations between the base station 105-b, the UE 115-c, and the UE 115-d may be transmitted in a different order than the example order shown, or the operations performed by the base station 105-d, the UE 115-c, and the UE 115-d may be performed in different orders or at different times, or the operations performed by a device may additionally or alternatively be performed by another device. Some operations may also be omitted from the process flow 500, and other operations may be added to the process flow 500.

At 505, the UE 115-c may receive a scheduling message from the base station 105-b. For example, the scheduling message may include or schedule a set of resources for downlink transmissions to the UE 115-c. For example, the scheduling message may indicate a set of resources that the UE 115-c is to monitor to receive a downlink message such as a reference signal, a control channel, a data channel, a synchronization signal block, among other examples. In some examples, the scheduling message may indicate that one or more resources of the set of resources for receiving the downlink message at the UE 115-c at least partially overlaps with a RACH occasion for use by the UE 115-d. In some examples, the scheduling message may include a semi-persistent scheduling message or may include an indication of resources for transmitting a CLI indication, or both. In some examples, the indication is transmitted via PUCCH that additionally includes a feedback indication or a scheduling request.

At 510, the UE 115-d may transmit a RACH message during a RACH occasion that at least partially overlaps with a downlink resources scheduled by the scheduling message. For example, the UE 115-d may transmit a RACH preamble or a RACH msg0, among other examples during the RACH occasion which may cause CLI with the downlink message transmitted (and received by the UE 115-c at 515) during the overlapping downlink resource.

At 520, the UE 115-c may detect CLI. For example, the UE 115-c may detect that the CLI satisfies a threshold and at 530 or 535 may transmit an indication of the CLI to the base station 105-b or the UE 115-d, respectively. In some examples, at 525, the UE 115-c may identify the source of the CLI and may transmit the indication of the CLI to the source of the CLI (in this example, UE 115-d).

At 540, in some examples, based on the CLI indication, the base station 105-b may transmit a second scheduling indication to the UE 115-c. For example, the base station 105-b may indicate to the UE 115-c to refrain from monitoring for a second downlink communication communicated for a period of time after the RO based on receiving the indication. In some examples, the base station 105-b may indicate a set of resources for receiving a second downlink message that occur after a period of time following the RACH occasion. In some examples, the base station 105-b may refrain from transmitting the second downlink message for a period of time following the RACH occasion.

At 545, in some examples, based on receiving the CLI indication, the UE 115-d may refrain from communicating over at least one instance of the RO that occurs within a time threshold after the second resource for the RO.

At 550, in some examples, based on transmitting the CLI indication or based on the second scheduling message from the base station 105-b, the UE 115-c may monitor one or more resources (e.g., according to an SPS configuration) for the second downlink communication communicated over one or more resources that occur within a time threshold after the RACH occasion based on detecting that the CLI fails to satisfy the threshold or may refrain from monitoring for the second downlink communication within a time threshold after the RACH message transmitted on the interfering RACH occasion.

At 555, in some examples, the base station may refrain from transmitting the second downlink communication based on the CLI indication to the UE 115-c over one or more resources within a time threshold that occurs after the interfering RACH occasion.

At 560, the base station 105-b may transmit the second downlink message in accordance with one or more CLI mitigation techniques as described herein.

Figure 6:
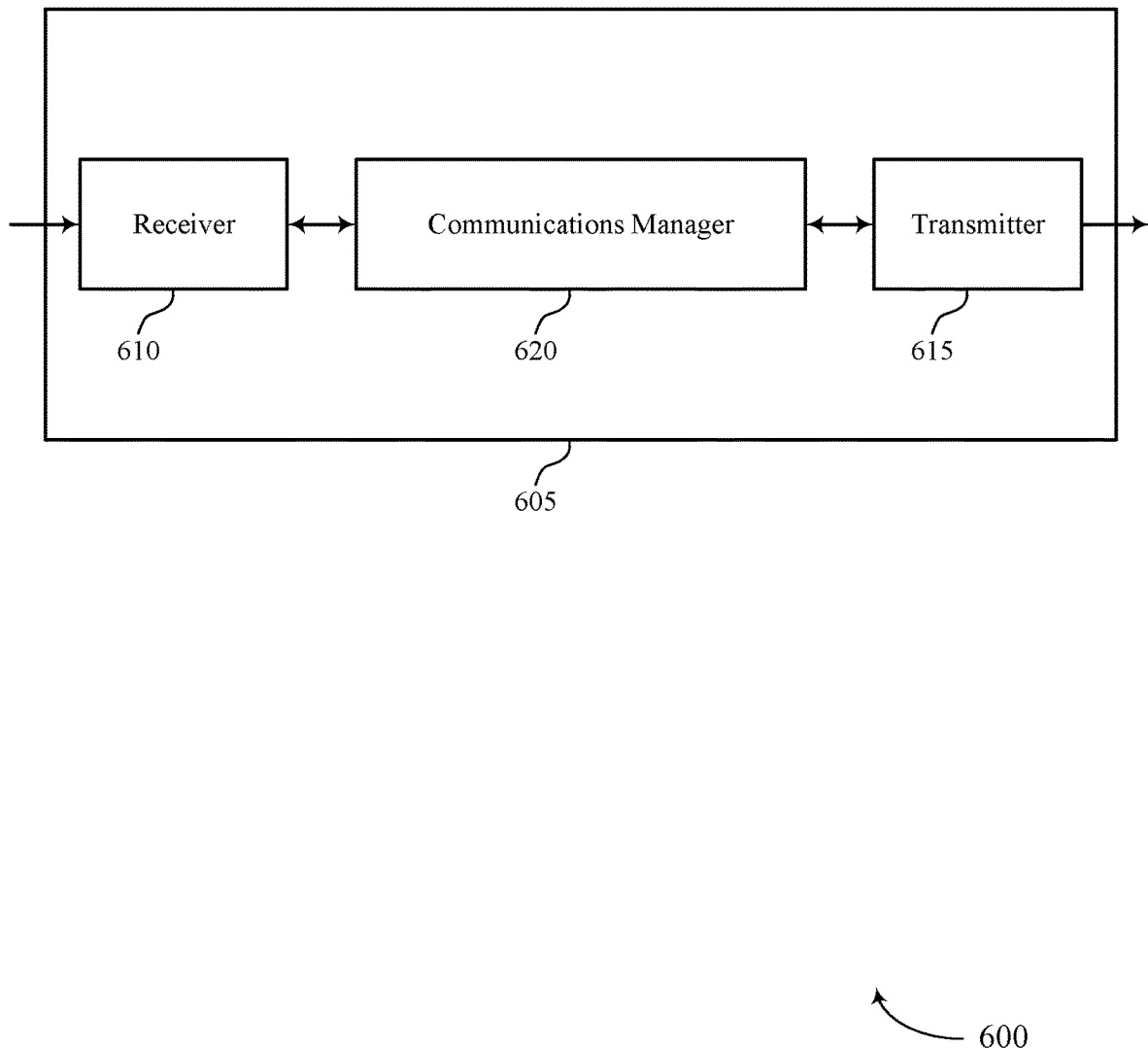
FIGS. 6 and 7 show block diagrams of devices that support ROs and resources for interference mitigation in accordance with aspects of the present disclosure.

FIG. 6 shows a block diagram 600 of a device 605 that supports ROs and resources for interference mitigation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to ROs and resources for interference mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to ROs and resources for interference mitigation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of ROs and resources for interference mitigation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving a message scheduling a first resource for a downlink communication between a base station and the first UE, the first resource overlapping with a second resource for a RO for use by one or more second UEs. The communications manager 620 may be configured as or otherwise support a means for receiving the downlink communication over the first resource based on receiving the message. The communications manager 620 may be configured as or otherwise support a means for transmitting, over a third resource, an indication of CLI between a RACH message transmitted over the second resource and the downlink communication communicated to at least one UE of the one or more second UEs. The communications manager 620 may be configured as or otherwise support a means for receiving a second downlink communication over a fourth resource based on transmitting the indication.

Additionally or alternatively, the communications manager 620 may support wireless communication at a first UE in accordance with examples as disclosed herein. For example, the communications manager 620 may be configured as or otherwise support a means for receiving a message scheduling a first resource for a downlink communication between a base station and the first UE, the first resource overlapping with a second resource for a RO for use by one or more second UEs, where the first resource for the downlink communication is full-duplexed with the second resource for the RO. The communications manager 620 may be configured as or otherwise support a means for receiving the downlink communication over the first resource based on receiving the message. The communications manager 620 may be configured as or otherwise support a means for transmitting, to the base station over a third resource, an indication of CLI between a RACH message transmitted over the second resource and the downlink communication received from the base station.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced latency and more efficient utilization of communication resources.

Figure 7:
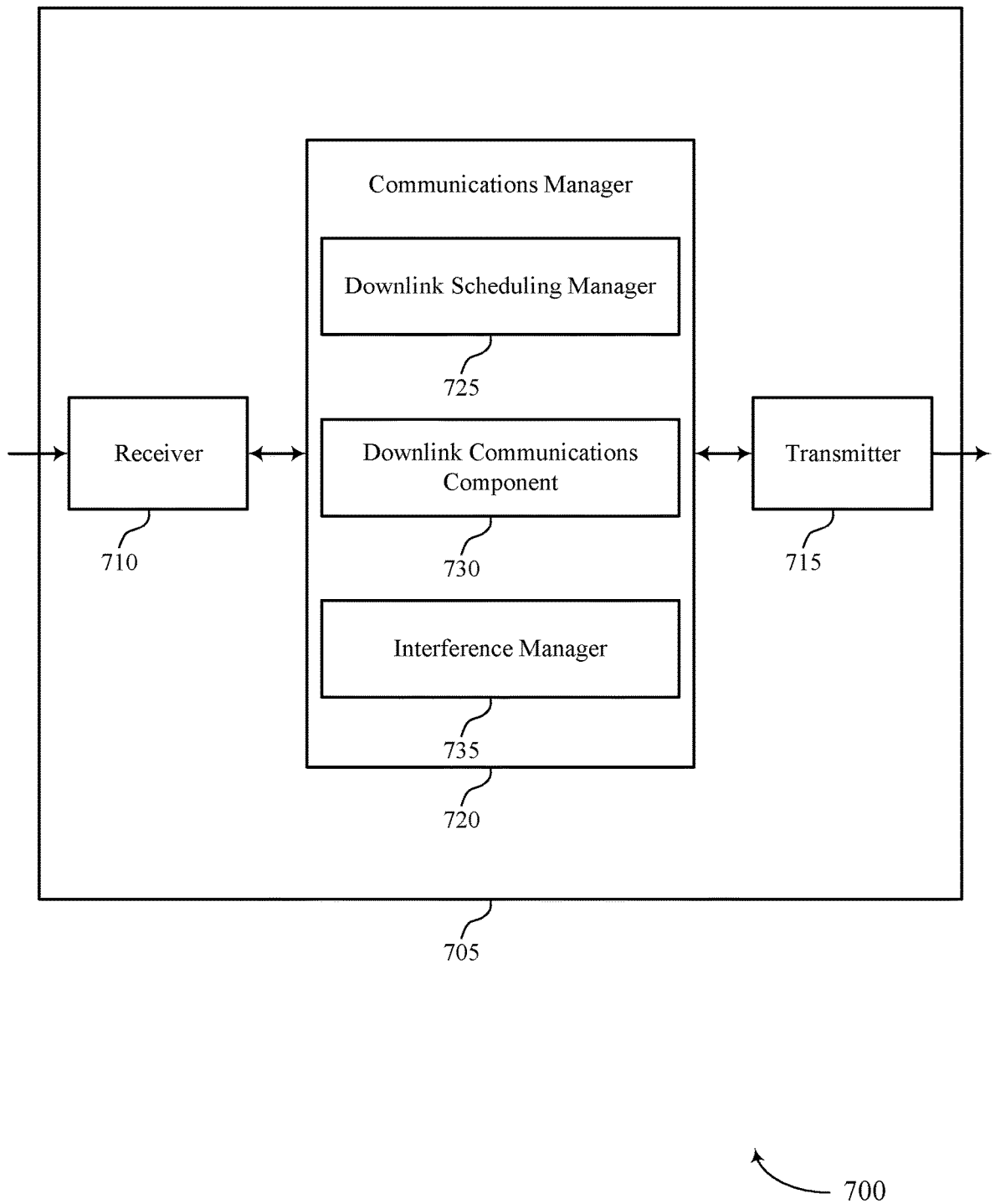

FIG. 7 shows a block diagram 700 of a device 705 that supports ROs and resources for interference mitigation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to ROs and resources for interference mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to ROs and resources for interference mitigation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of ROs and resources for interference mitigation as described herein. For example, the communications manager 720 may include a downlink scheduling manager 725, a downlink communications component 730, an interference manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The downlink scheduling manager 725 may be configured as or otherwise support a means for receiving a message scheduling a first resource for a downlink communication between a base station and the first UE, the first resource overlapping with a second resource for a RO for use by one or more second UEs. The downlink communications component 730 may be configured as or otherwise support a means for receiving the downlink communication over the first resource based on receiving the message. The interference manager 735 may be configured as or otherwise support a means for transmitting, over a third resource, an indication of CLI between a RACH message transmitted over the second resource and the downlink communication communicated to at least one UE of the one or more second UEs. The downlink communications component 730 may be configured as or otherwise support a means for receiving a second downlink communication over a fourth resource based on transmitting the indication.

Additionally or alternatively, the communications manager 720 may support wireless communication at a first UE in accordance with examples as disclosed herein. The downlink scheduling manager 725 may be configured as or otherwise support a means for receiving a message scheduling a first resource for a downlink communication between a base station and the first UE, the first resource overlapping with a second resource for a RO for use by one or more second UEs, where the first resource for the downlink communication is full-duplexed with the second resource for the RO. The downlink communications component 730 may be configured as or otherwise support a means for receiving the downlink communication over the first resource based on receiving the message. The interference manager 735 may be configured as or otherwise support a means for transmitting, to the base station over a third resource, an indication of CLI between a RACH message transmitted over the second resource and the downlink communication received from the base station.

Figure 8:
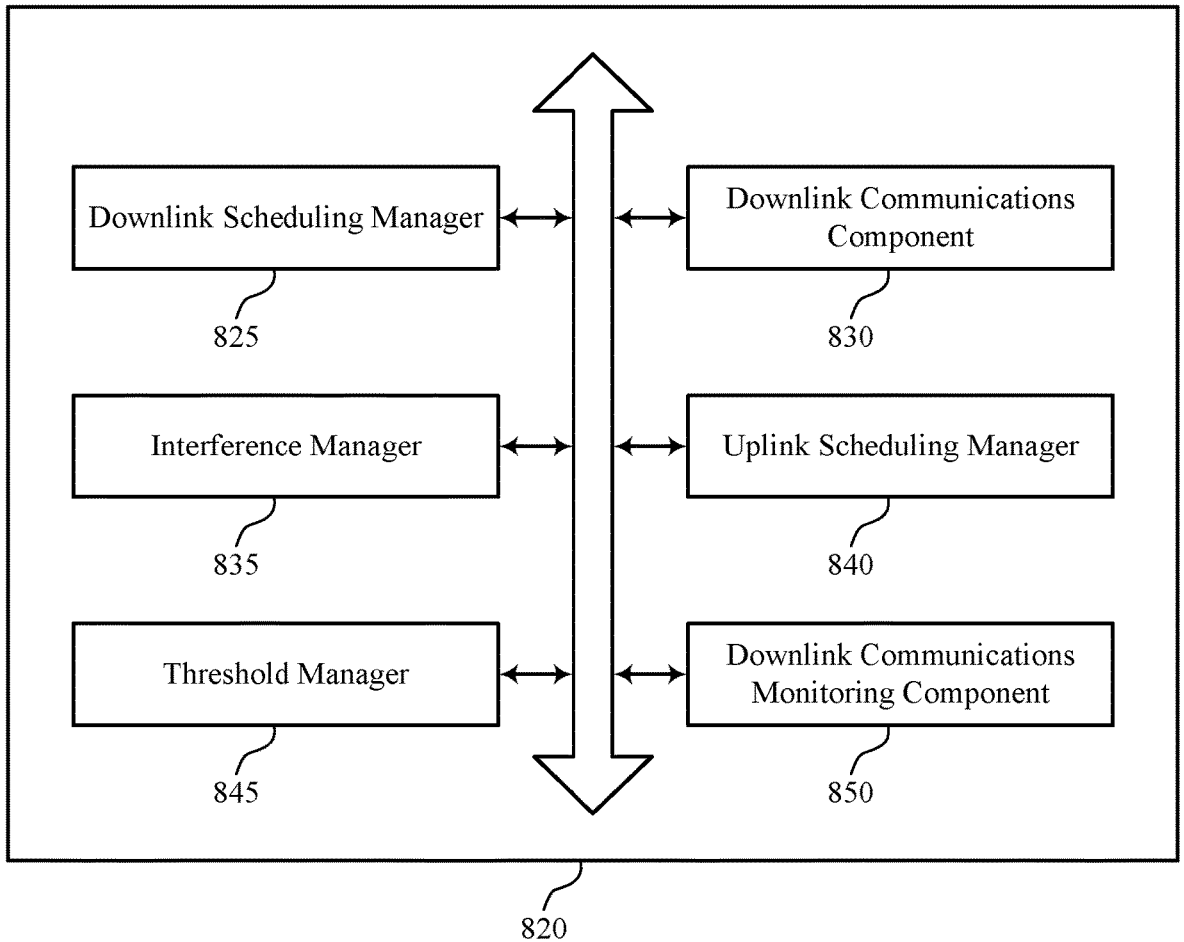
FIG. 8 shows a block diagram of a communications manager that supports ROs and resources for interference mitigation in accordance with aspects of the present disclosure.

FIG. 8 shows a block diagram 800 of a communications manager 820 that supports ROs and resources for interference mitigation in accordance with aspects of the present disclosure. The communications manager 820 may be an example of aspects of a communications manager 620, a communications manager 720, or both, as described herein. The communications manager 820, or various components thereof, may be an example of means for performing various aspects of ROs and resources for interference mitigation as described herein. For example, the communications manager 820 may include a downlink scheduling manager 825, a downlink communications component 830, an interference manager 835, an uplink scheduling manager 840, a threshold manager 845, a downlink communications monitoring component 850, or any combination thereof. Each of these components may communicate, directly or indirectly, with one another (e.g., via one or more buses).

The communications manager 820 may support wireless communication at a first UE in accordance with examples as disclosed herein. The downlink scheduling manager 825 may be configured as or otherwise support a means for receiving a message scheduling a first resource for a downlink communication between a base station and the first UE, the first resource overlapping with a second resource for a RO for use by one or more second UEs. The downlink communications component 830 may be configured as or otherwise support a means for receiving the downlink communication over the first resource based on receiving the message. The interference manager 835 may be configured as or otherwise support a means for transmitting, over a third resource, an indication of CLI between a RACH message transmitted over the second resource and the downlink communication communicated to at least one UE of the one or more second UEs. In some examples, the downlink communications component 830 may be configured as or otherwise support a means for receiving a second downlink communication over a fourth resource based on transmitting the indication.

In some examples, the first resource for the downlink communication is full-duplexed with the second resource of the RO.

In some examples, the interference manager 835 may be configured as or otherwise support a means for detecting that the CLI between the RACH message transmitted over the second resource and the downlink communication communicated to the at least one UE of the one or more second UEs satisfies a threshold, where transmitting the indication is based on detecting that the CLI satisfies the threshold.

In some examples, the uplink scheduling manager 840 may be configured as or otherwise support a means for receiving, as part of the message, a second indication of the third resource used to transmit the indication, where transmitting the indication is based on receiving the second indication of the third resource.

In some examples, the interference manager 835 may be configured as or otherwise support a means for identifying a second UE of the one or more second UEs that is causing the CLI with the downlink communication, where the indication is transmitted to the second UE based on identifying the second UE.

In some examples, the indication of the CLI causes a second UE of the one or more second UEs to refrain from communicating over at least one instance of the RO that occurs within a time threshold after the second resource for the RO.

In some examples, the CLI is interference caused by a full-duplex configuration between the downlink communication and an uplink communication transmitted over the RO.

In some examples, the indication includes a destination UE identifier associated with the one or more second UEs.

In some examples, the third resource is configured for downlink communications with a high-priority.

In some examples, the third resource includes a sidelink communication resource.

In some examples, the third resource corresponds to a first communication beam and a second third resource corresponds to a second communication beam.

Additionally or alternatively, the communications manager 820 may support wireless communication at a first UE in accordance with examples as disclosed herein. In some examples, the downlink scheduling manager 825 may be configured as or otherwise support a means for receiving a message scheduling a first resource for a downlink communication between a base station and the first UE, the first resource overlapping with a second resource for a RO for use by one or more second UEs, where the first resource for the downlink communication is full-duplexed with the second resource for the RO. In some examples, the downlink communications component 830 may be configured as or otherwise support a means for receiving the downlink communication over the first resource based on receiving the message. In some examples, the interference manager 835 may be configured as or otherwise support a means for transmitting, to the base station over a third resource, an indication of CLI between a RACH message transmitted over the second resource and the downlink communication received from the base station.

In some examples, the threshold manager 845 may be configured as or otherwise support a means for detecting whether the CLI between the RACH message transmitted over the second resource and the downlink communication received from the base station satisfies a threshold based on receiving the downlink communication, where transmitting the indication is based on determining whether the CLI satisfies the threshold.

In some examples, the downlink communications monitoring component 850 may be configured as or otherwise support a means for monitoring for a second downlink communication communicated over one or more resources that occur within a time threshold after the second resource for the RO based on detecting that the CLI fails to satisfy the threshold.

In some examples, the downlink communications monitoring component 850 may be configured as or otherwise support a means for refraining from monitoring for a second downlink communication communicated over one or more resources that occur within a time threshold after the second resource for the RO based on detecting that the CLI satisfies the threshold.

In some examples, the downlink communications monitoring component 850 may be configured as or otherwise support a means for receiving a second indication from the base station to refrain from monitoring for a second downlink communication communicated over one or more resources that occur within a time threshold after the second resource for the RO based on transmitting the second indication.

In some examples, the uplink scheduling manager 840 may be configured as or otherwise support a means for receiving, as part of the message, a second indication of the third resource used to communicate the indication of the CLI.

In some examples, the indication is transmitted via PUCCH. In some examples, the PUCCH includes a feedback indication or a scheduling request, or both.

Figure 9:
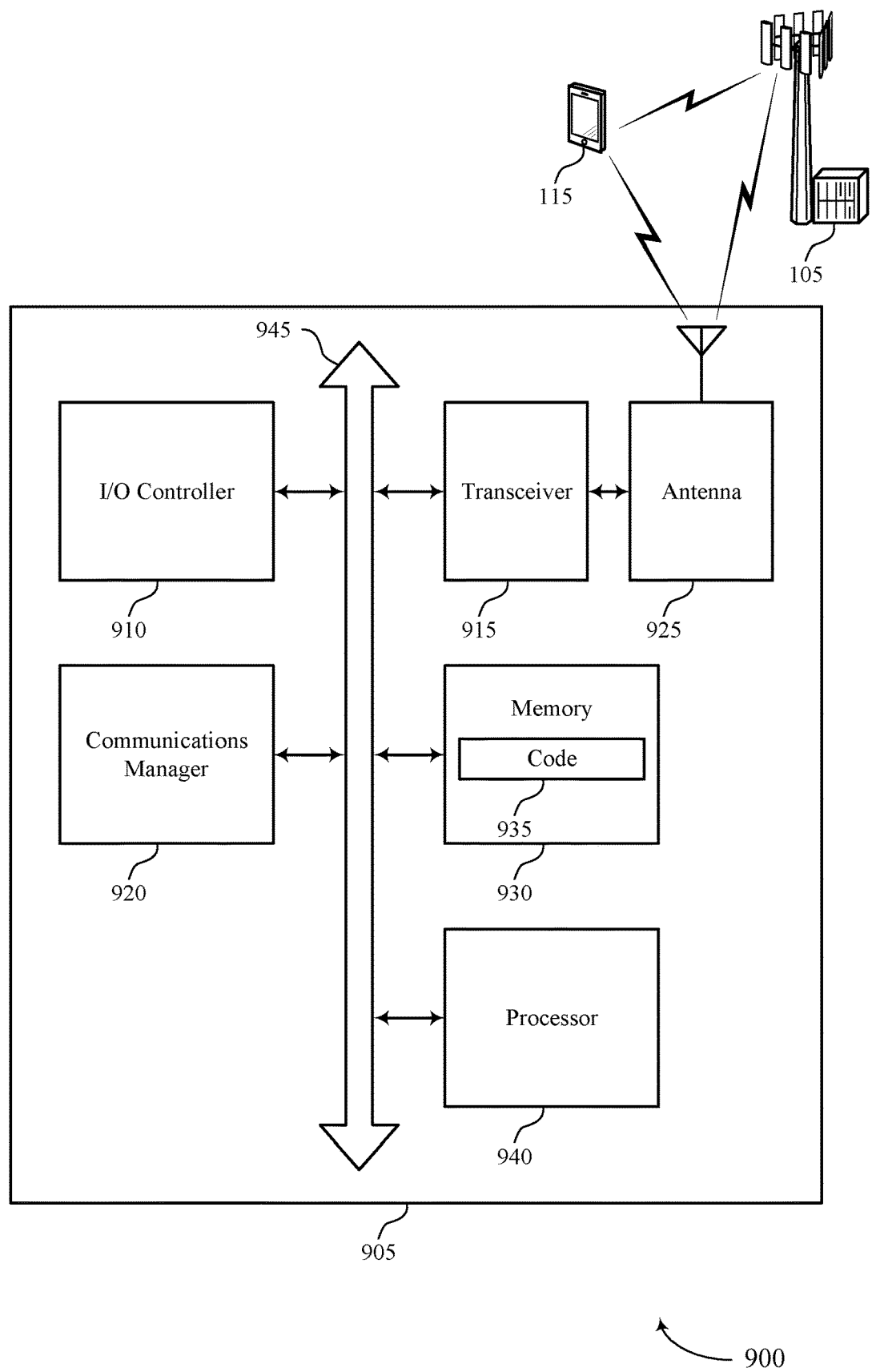
FIG. 9 shows a diagram of a system including a device that supports ROs and resources for interference mitigation in accordance with aspects of the present disclosure.

FIG. 9 shows a diagram of a system 900 including a device 905 that supports ROs and resources for interference mitigation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting ROs and resources for interference mitigation). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving a message scheduling a first resource for a downlink communication between a base station and the first UE, the first resource overlapping with a second resource for a RO for use by one or more second UEs. The communications manager 920 may be configured as or otherwise support a means for receiving the downlink communication over the first resource based on receiving the message. The communications manager 920 may be configured as or otherwise support a means for transmitting, over a third resource, an indication of CLI between a RACH message transmitted over the second resource and the downlink communication communicated to at least one UE of the one or more second UEs. The communications manager 920 may be configured as or otherwise support a means for receiving a second downlink communication over a fourth resource based on transmitting the indication.

Additionally or alternatively, the communications manager 920 may support wireless communication at a first UE in accordance with examples as disclosed herein. For example, the communications manager 920 may be configured as or otherwise support a means for receiving a message scheduling a first resource for a downlink communication between a base station and the first UE, the first resource overlapping with a second resource for a RO for use by one or more second UEs, where the first resource for the downlink communication is full-duplexed with the second resource for the RO. The communications manager 920 may be configured as or otherwise support a means for receiving the downlink communication over the first resource based on receiving the message. The communications manager 920 may be configured as or otherwise support a means for transmitting, to the base station over a third resource, an indication of CLI between a RACH message transmitted over the second resource and the downlink communication received from the base station.

By including or configuring the communications manager 920 in accordance with examples as described herein, the device 905 may support techniques for improved communication reliability, reduced latency, reduced power consumption, more efficient utilization of communication resources, and improved coordination between devices, among other examples.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of ROs and resources for interference mitigation as described herein, or the processor 940 and the memory 930 may be otherwise configured to perform or support such operations.

Figure 10:
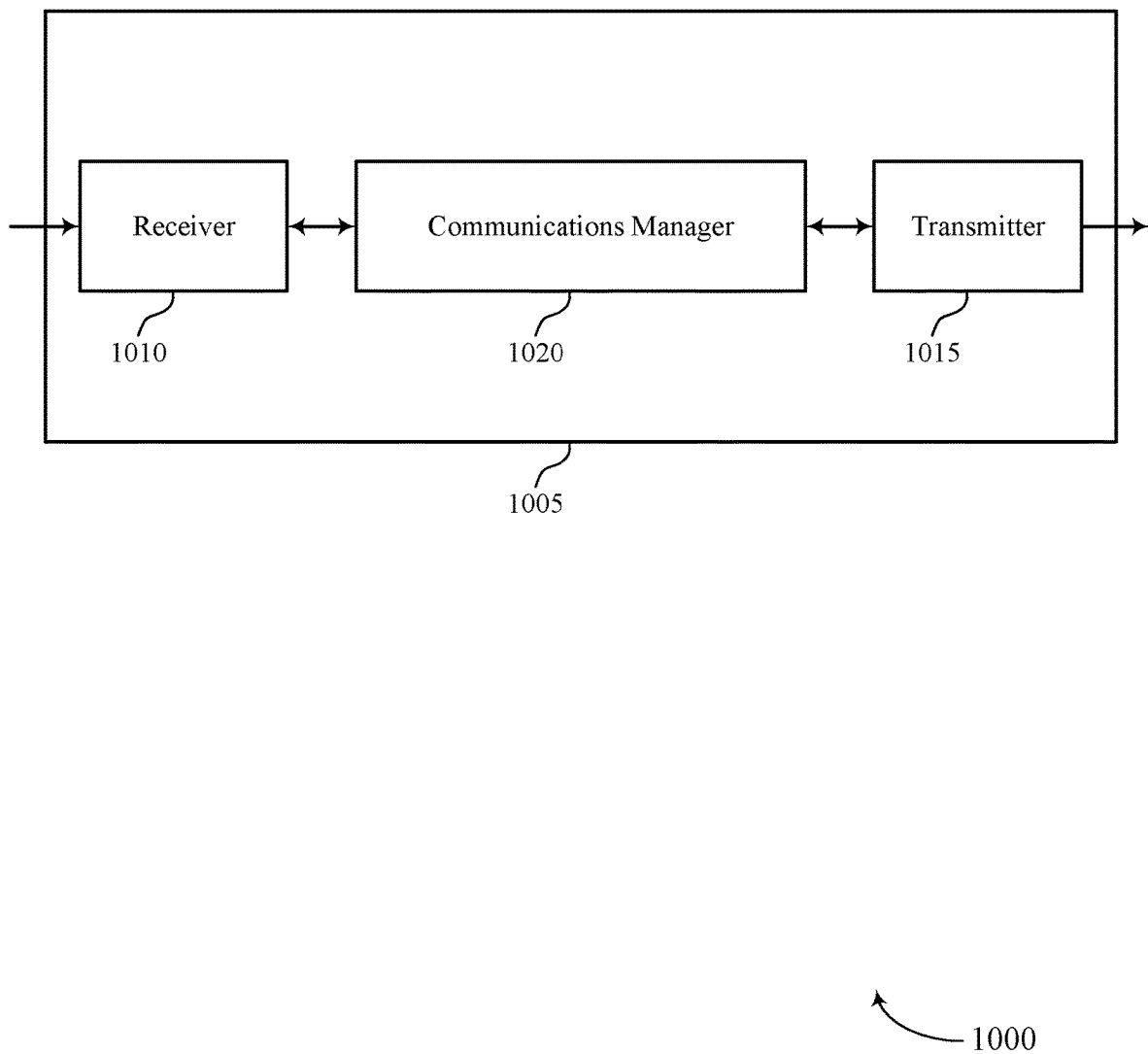
FIGS. 10 and 11 show block diagrams of devices that support ROs and resources for interference mitigation in accordance with aspects of the present disclosure.

FIG. 10 shows a block diagram 1000 of a device 1005 that supports ROs and resources for interference mitigation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to ROs and resources for interference mitigation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to ROs and resources for interference mitigation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of ROs and resources for interference mitigation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The communications manager 1020 may be configured as or otherwise support a means for transmitting the downlink communication over the first resource based on transmitting the message. The communications manager 1020 may be configured as or otherwise support a means for receiving, from the first UE over a third resource, an indication of CLI between a RACH message transmitted over the second resource and the downlink communication transmitted by the base station.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources and reduced latency, among other examples.

Figure 11:
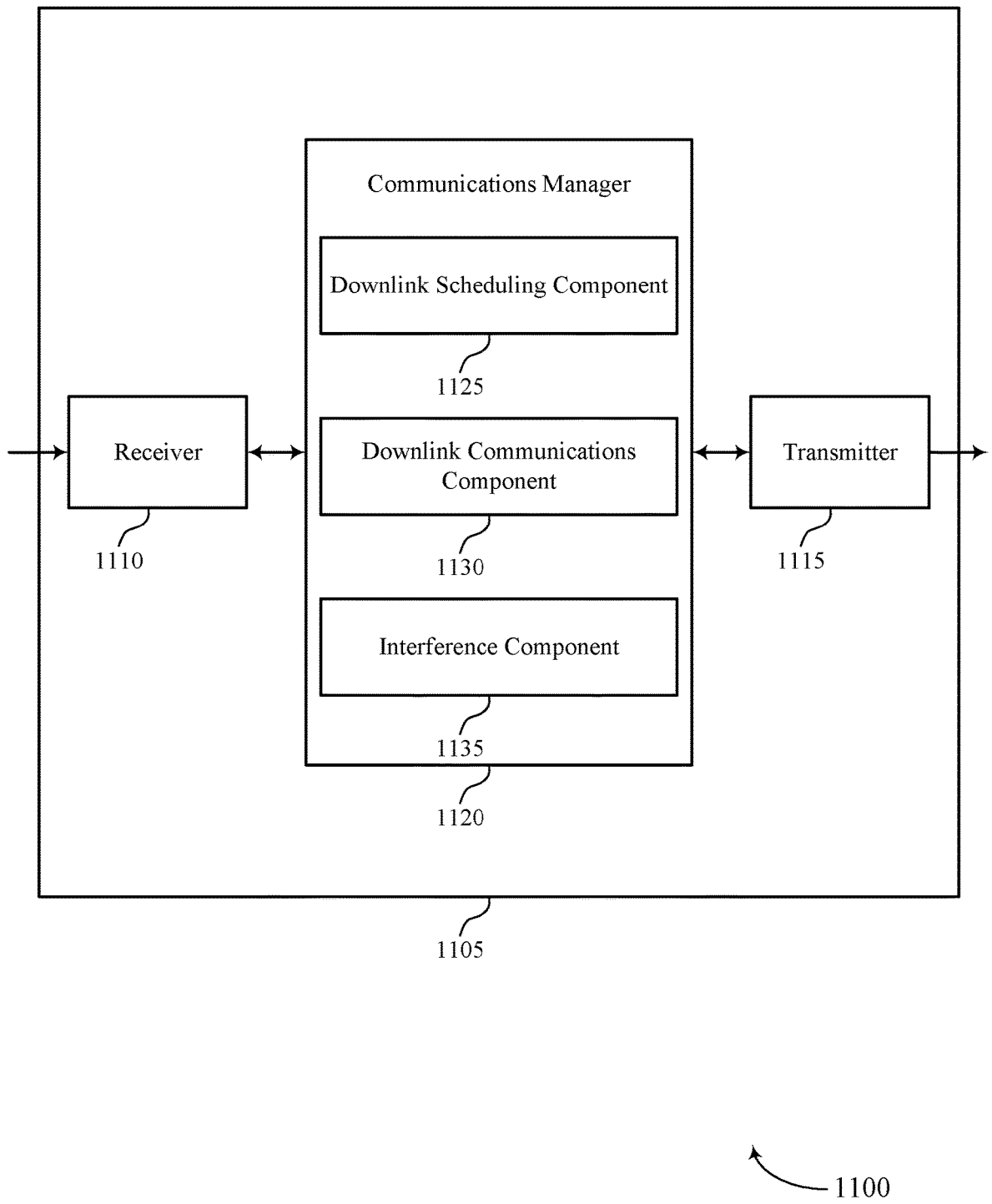

FIG. 11 shows a block diagram 1100 of a device 1105 that supports ROs and resources for interference mitigation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to ROs and resources for interference mitigation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to ROs and resources for interference mitigation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of ROs and resources for interference mitigation as described herein. For example, the communications manager 1120 may include a downlink scheduling component 1125, a downlink communications component 1130, an interference component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The downlink scheduling component 1125 may be configured as or otherwise support a means for transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The downlink communications component 1130 may be configured as or otherwise support a means for transmitting the downlink communication over the first resource based on transmitting the message. The interference component 1135 may be configured as or otherwise support a means for receiving, from the first UE over a third resource, an indication of CLI between a RACH message transmitted over the second resource and the downlink communication transmitted by the base station.

Figure 12:
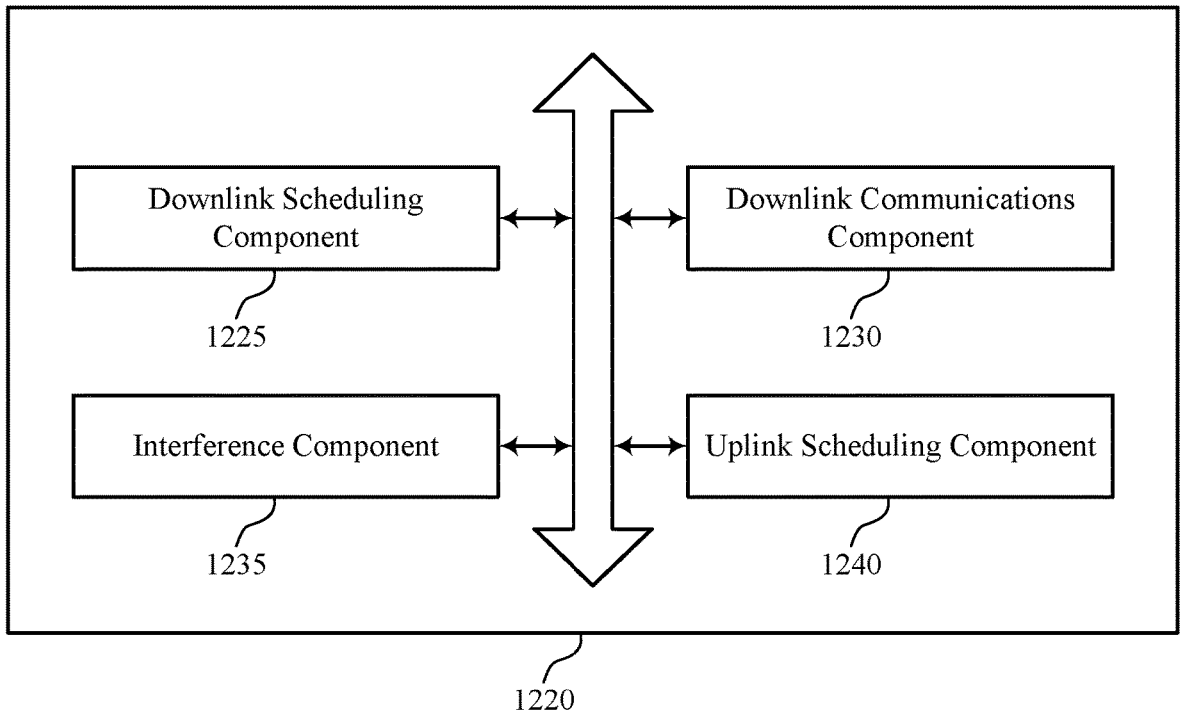
FIG. 12 shows a block diagram of a communications manager that supports ROs and resources for interference mitigation in accordance with aspects of the present disclosure.

FIG. 12 shows a block diagram 1200 of a communications manager 1220 that supports ROs and resources for interference mitigation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of ROs and resources for interference mitigation as described herein. For example, the communications manager 1220 may include a downlink scheduling component 1225, a downlink communications component 1230, an interference component 1235, an uplink scheduling component 1240, or any combination thereof. Each of these components may communicate, directly or indirectly, with one another (e.g., via one or more buses).

The communications manager 1220 may support wireless communication at a base station in accordance with examples as disclosed herein. The downlink scheduling component 1225 may be configured as or otherwise support a means for transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The downlink communications component 1230 may be configured as or otherwise support a means for transmitting the downlink communication over the first resource based on transmitting the message. The interference component 1235 may be configured as or otherwise support a means for receiving, from the first UE over a third resource, an indication of CLI between a RACH message transmitted over the second resource and the downlink communication transmitted by the base station.

In some examples, the downlink communications component 1230 may be configured as or otherwise support a means for transmitting, to the first UE over one or more resources that occur within a time threshold after the second resource for the RO, a second downlink communication based on the indication of the CLI indicating that the CLI fails to satisfy a threshold.

In some examples, the downlink communications component 1230 may be configured as or otherwise support a means for refraining from transmitting, to the first UE over one or more resources within a time threshold that occur after the second resource for the RO, a second downlink communication based on the indication of the CLI indicating that the CLI satisfies a threshold.

In some examples, the downlink scheduling component 1225 may be configured as or otherwise support a means for transmitting a second indication to indicate to the first UE to refrain from monitoring for a second downlink communication communicated over one or more resources that occur within a time threshold after the second resource for the RO based on receiving the indication.

In some examples, the uplink scheduling component 1240 may be configured as or otherwise support a means for transmitting, as part of the message, a second indication of the third resource used to communicate the indication of the CLI.

In some examples, the indication is received via PUCCH. In some examples, the PUCCH includes a feedback indication or a scheduling request, or both.

Figure 13:
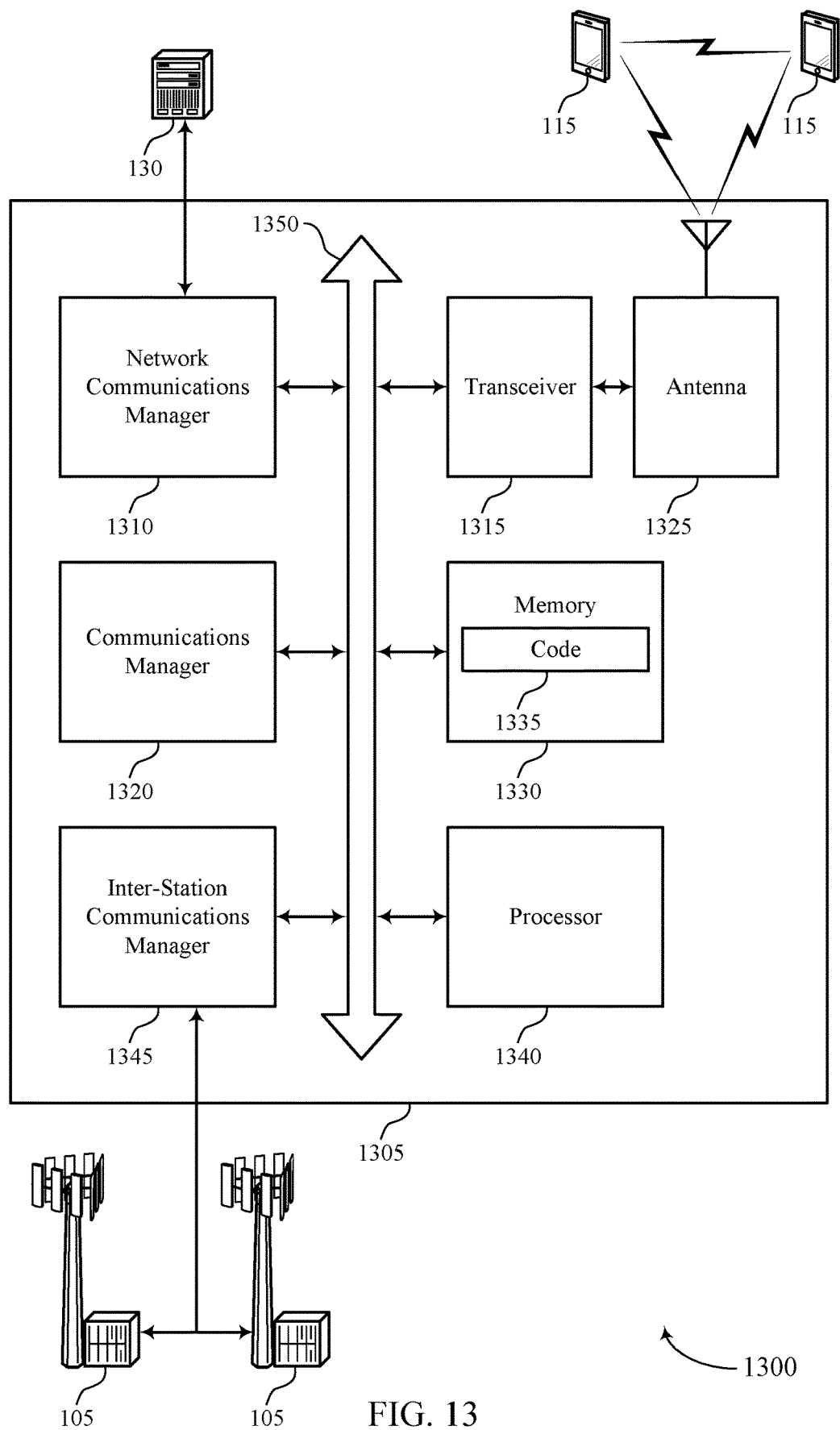
FIG. 13 shows a diagram of a system including a device that supports ROs and resources for interference mitigation in accordance with aspects of the present disclosure.

FIG. 13 shows a diagram of a system 1300 including a device 1305 that supports ROs and resources for interference mitigation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting ROs and resources for interference mitigation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The communications manager 1320 may be configured as or otherwise support a means for transmitting the downlink communication over the first resource based on transmitting the message. The communications manager 1320 may be configured as or otherwise support a means for receiving, from the first UE over a third resource, an indication of CLI between a RACH message transmitted over the second resource and the downlink communication transmitted by the base station.

By including or configuring the communications manager 1320 in accordance with examples as described herein, the device 1305 may support techniques for improved communication reliability, reduced latency, reduced power consumption, more efficient utilization of communication resources, and improved coordination between devices, among other examples.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of ROs and resources for interference mitigation as described herein, or the processor 1340 and the memory 1330 may be otherwise configured to perform or support such operations.

Figure 14:
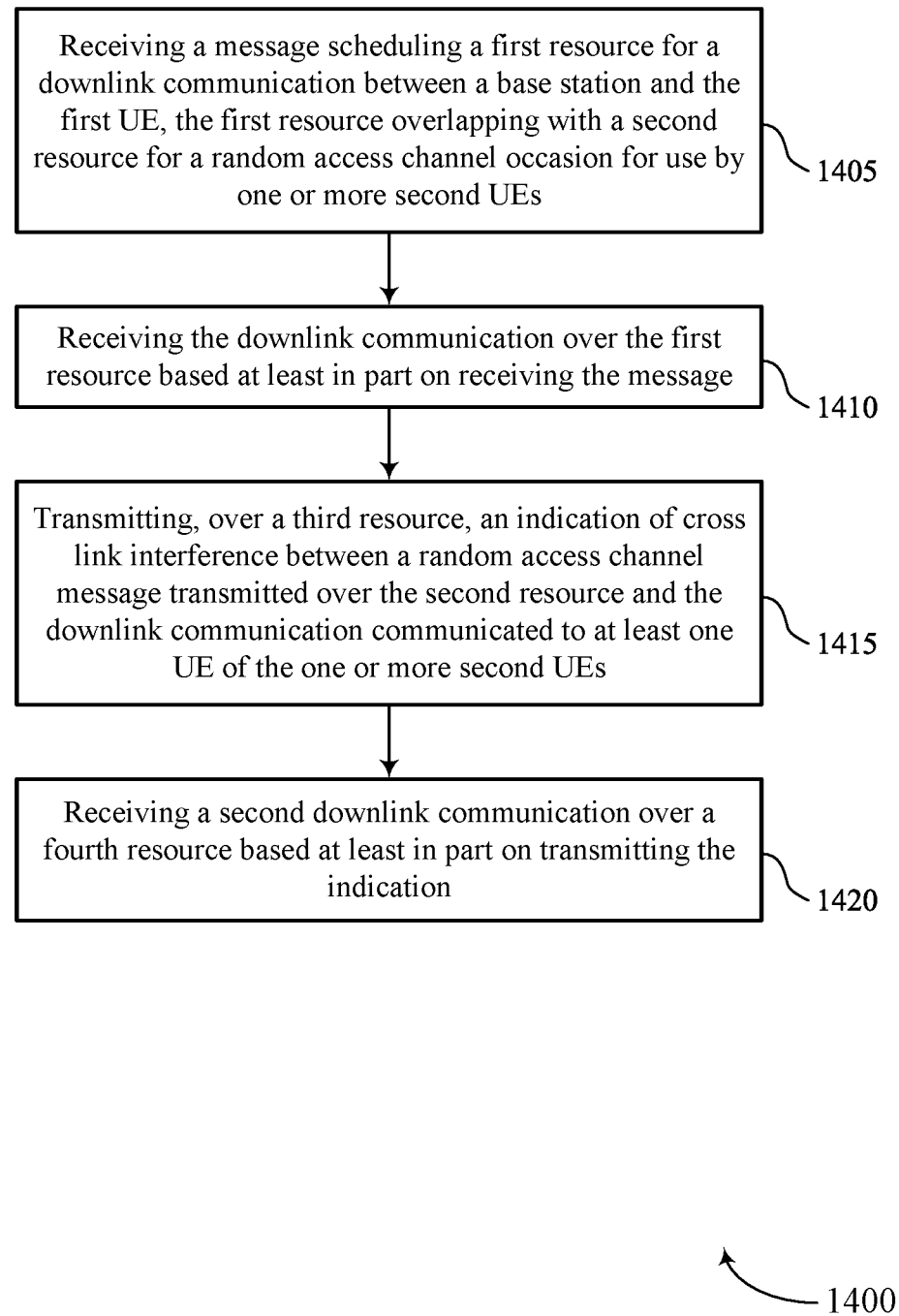
FIGS. 14 through 22 show flowcharts illustrating methods that support ROs and resources for interference mitigation in accordance with aspects of the present disclosure.

FIG. 14 shows a flowchart illustrating a method 1400 that supports ROs and resources for interference mitigation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a message scheduling a first resource for a downlink communication between a base station and the first UE, the first resource overlapping with a second resource for a RO for use by one or more second UEs. The operations of 1405 may be performed in accordance with examples as disclosed herein. In some examples, aspects of the operations of 1405 may be performed by a downlink scheduling manager 825 as described with reference to FIG. 8.

At 1410, the method may include receiving the downlink communication over the first resource based on receiving the message. The operations of 1410 may be performed in accordance with examples as disclosed herein. In some examples, aspects of the operations of 1410 may be performed by a downlink communications component 830 as described with reference to FIG. 8.

At 1415, the method may include transmitting, over a third resource, an indication of CLI between a RACH message transmitted over the second resource and the downlink communication communicated to at least one UE of the one or more second UEs. The operations of 1415 may be performed in accordance with examples as disclosed herein. In some examples, aspects of the operations of 1415 may be performed by an interference manager 835 as described with reference to FIG. 8.

At 1420, the method may include receiving a second downlink communication over a fourth resource based on transmitting the indication. The operations of 1420 may be performed in accordance with examples as disclosed herein. In some examples, aspects of the operations of 1420 may be performed by a downlink communications component 830 as described with reference to FIG. 8.

Figure 15:
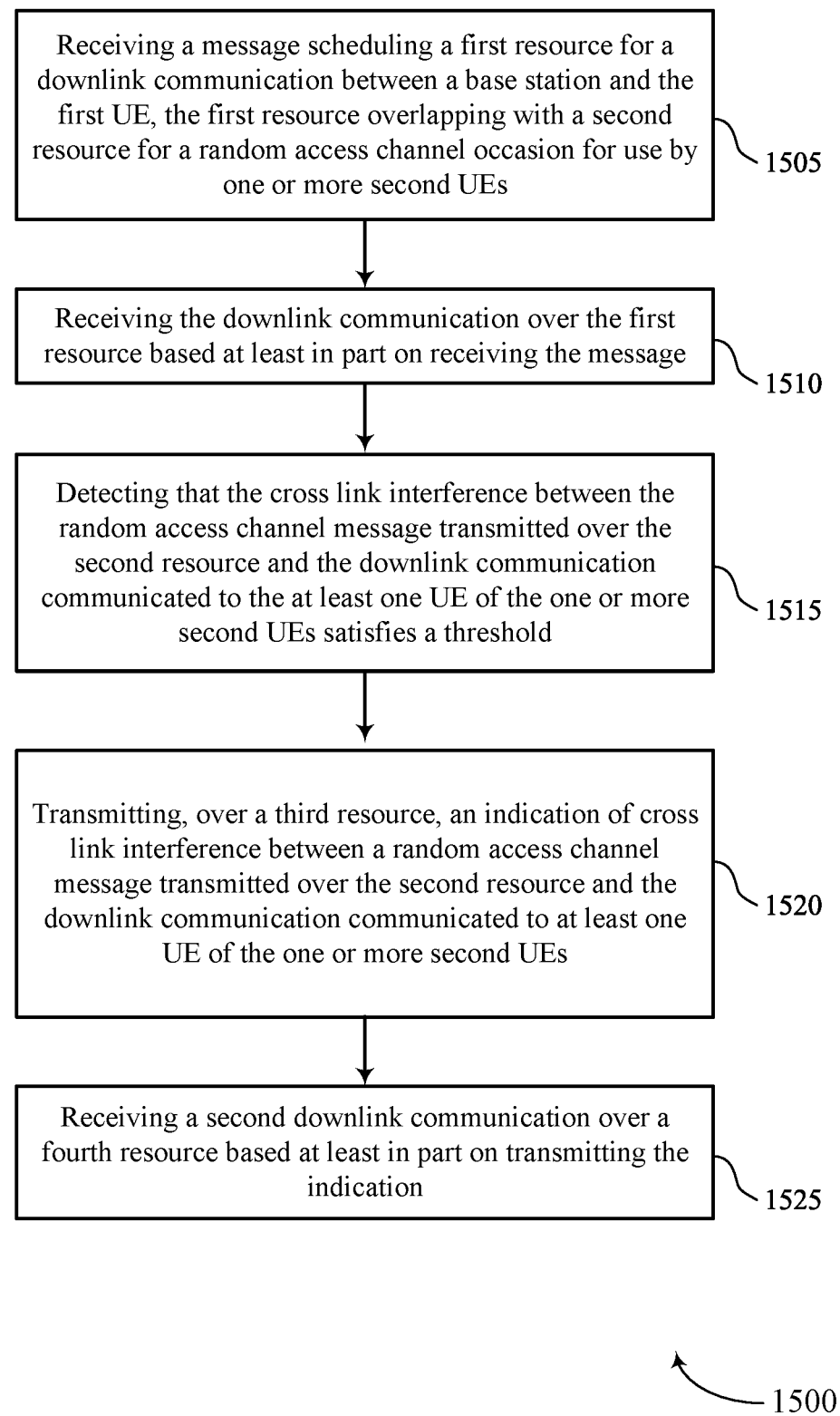

FIG. 15 shows a flowchart illustrating a method 1500 that supports ROs and resources for interference mitigation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a message scheduling a first resource for a downlink communication between a base station and the first UE, the first resource overlapping with a second resource for a RO for use by one or more second UEs. The operations of 1505 may be performed in accordance with examples as disclosed herein. In some examples, aspects of the operations of 1505 may be performed by a downlink scheduling manager 825 as described with reference to FIG. 8.

At 1510, the method may include receiving the downlink communication over the first resource based on receiving the message. The operations of 1510 may be performed in accordance with examples as disclosed herein. In some examples, aspects of the operations of 1510 may be performed by a downlink communications component 830 as described with reference to FIG. 8.

At 1515, the method may include detecting that the CLI between the RACH message transmitted over the second resource and the downlink communication communicated to the at least one UE of the one or more second UEs satisfies a threshold, where transmitting the indication is based on detecting that the CLI satisfies the threshold. The operations of 1515 may be performed in accordance with examples as disclosed herein. In some examples, aspects of the operations of 1515 may be performed by an interference manager 835 as described with reference to FIG. 8.

At 1520, the method may include transmitting, over a third resource, an indication of CLI between a RACH message transmitted over the second resource and the downlink communication communicated to at least one UE of the one or more second UEs. The operations of 1520 may be performed in accordance with examples as disclosed herein.

In some examples, aspects of the operations of 1520 may be performed by an interference manager 835 as described with reference to FIG. 8.

At 1525, the method may include receiving a second downlink communication over a fourth resource based on transmitting the indication. The operations of 1525 may be performed in accordance with examples as disclosed herein. In some examples, aspects of the operations of 1525 may be performed by a downlink communications component 830 as described with reference to FIG. 8.

Figure 16:
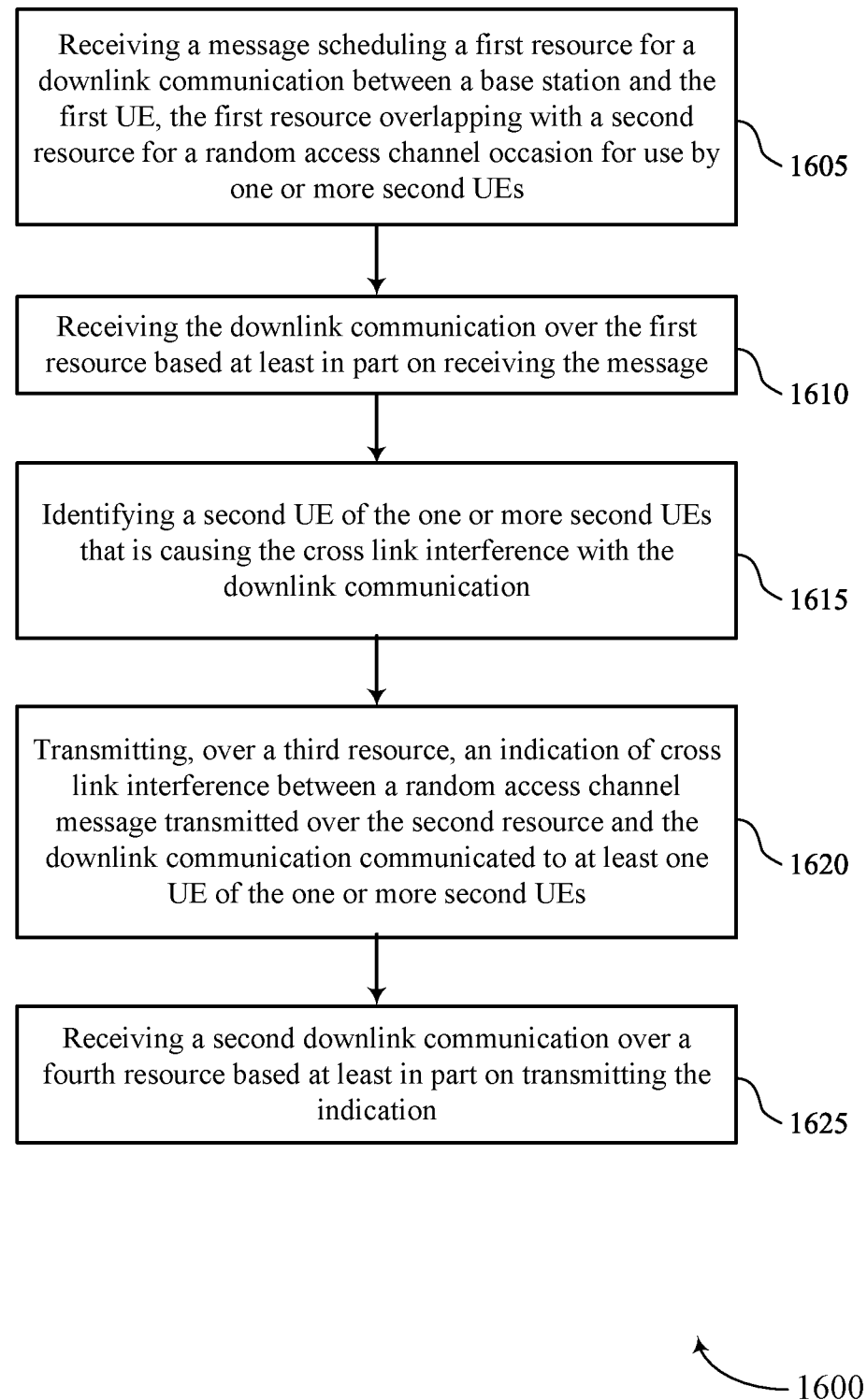

FIG. 16 shows a flowchart illustrating a method 1600 that supports ROs and resources for interference mitigation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a message scheduling a first resource for a downlink communication between a base station and the first UE, the first resource overlapping with a second resource for a RO for use by one or more second UEs. The operations of 1605 may be performed in accordance with examples as disclosed herein. In some examples, aspects of the operations of 1605 may be performed by a downlink scheduling manager 825 as described with reference to FIG. 8.

At 1610, the method may include receiving the downlink communication over the first resource based on receiving the message. The operations of 1610 may be performed in accordance with examples as disclosed herein. In some examples, aspects of the operations of 1610 may be performed by a downlink communications component 830 as described with reference to FIG. 8.

At 1615, the method may include identifying a second UE of the one or more second UEs that is causing the CLI with the downlink communication, where the indication is transmitted to the second UE based on identifying the second UE. The operations of 1615 may be performed in accordance with examples as disclosed herein. In some examples, aspects of the operations of 1615 may be performed by an interference manager 835 as described with reference to FIG. 8.

At 1620, the method may include transmitting, over a third resource, an indication of CLI between a RACH message transmitted over the second resource and the downlink communication communicated to at least one UE of the one or more second UEs. The operations of 1620 may be performed in accordance with examples as disclosed herein. In some examples, aspects of the operations of 1620 may be performed by an interference manager 835 as described with reference to FIG. 8.

At 1625, the method may include receiving a second downlink communication over a fourth resource based on transmitting the indication. The operations of 1625 may be performed in accordance with examples as disclosed herein. In some examples, aspects of the operations of 1625 may be performed by a downlink communications component 830 as described with reference to FIG. 8.

Figure 17:
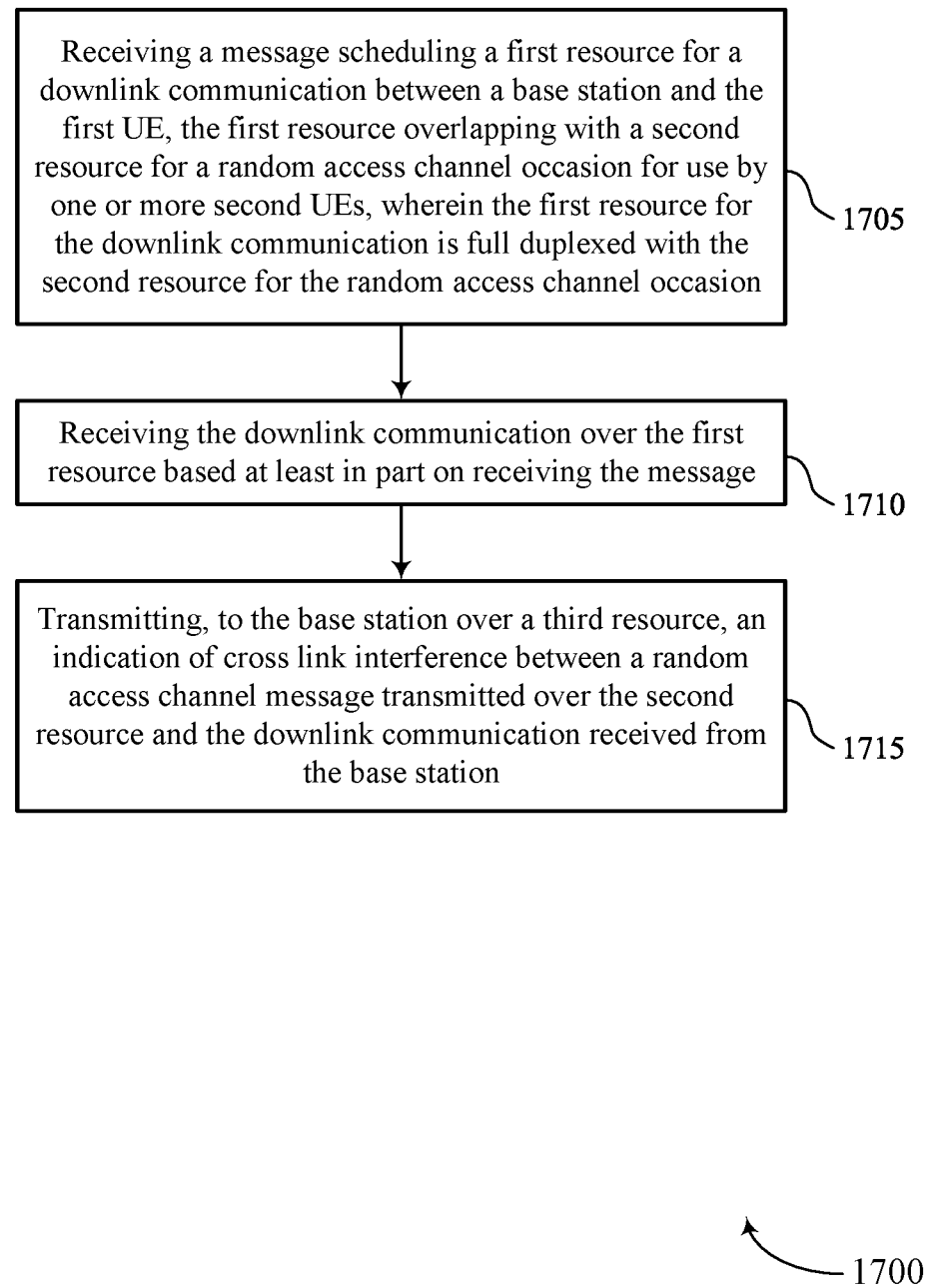

FIG. 17 shows a flowchart illustrating a method 1700 that supports ROs and resources for interference mitigation in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving a message scheduling a first resource for a downlink communication between a base station and the first UE, the first resource overlapping with a second resource for a RO for use by one or more second UEs, where the first resource for the downlink communication is full-duplexed with the second resource for the RO. The operations of 1705 may be performed in accordance with examples as disclosed herein. In some examples, aspects of the operations of 1705 may be performed by a downlink scheduling manager 825 as described with reference to FIG. 8.

At 1710, the method may include receiving the downlink communication over the first resource based on receiving the message. The operations of 1710 may be performed in accordance with examples as disclosed herein. In some examples, aspects of the operations of 1710 may be performed by a downlink communications component 830 as described with reference to FIG. 8.

At 1715, the method may include transmitting, to the base station over a third resource, an indication of CLI between a RACH message transmitted over the second resource and the downlink communication received from the base station. The operations of 1715 may be performed in accordance with examples as disclosed herein. In some examples, aspects of the operations of 1715 may be performed by an interference manager 835 as described with reference to FIG. 8.

Figure 18:
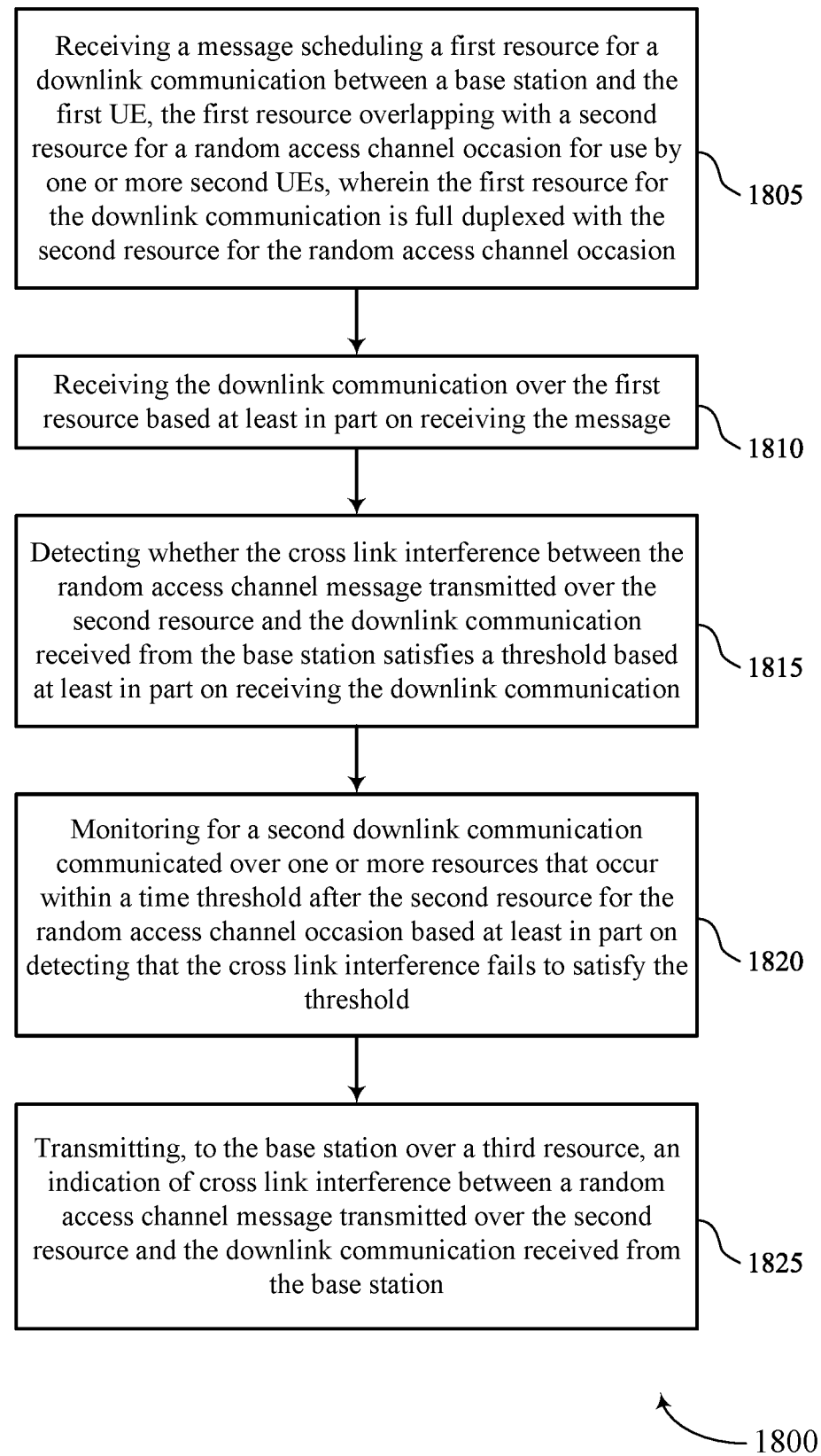

FIG. 18 shows a flowchart illustrating a method 1800 that supports ROs and resources for interference mitigation in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving a message scheduling a first resource for a downlink communication between a base station and the first UE, the first resource overlapping with a second resource for a RO for use by one or more second UEs, where the first resource for the downlink communication is full-duplexed with the second resource for the RO. The operations of 1805 may be performed in accordance with examples as disclosed herein. In some examples, aspects of the operations of 1805 may be performed by a downlink scheduling manager 825 as described with reference to FIG. 8.

At 1810, the method may include receiving the downlink communication over the first resource based on receiving the message. The operations of 1810 may be performed in accordance with examples as disclosed herein. In some examples, aspects of the operations of 1810 may be performed by a downlink communications component 830 as described with reference to FIG. 8.

At 1815, the method may include detecting whether the CLI between the RACH message transmitted over the second resource and the downlink communication received from the base station satisfies a threshold based on receiving the downlink communication, where transmitting the indication is based on determining whether the CLI satisfies the threshold. The operations of 1815 may be performed in accordance with examples as disclosed herein. In some examples, aspects of the operations of 1815 may be performed by a threshold manager 845 as described with reference to FIG. 8.

At 1820, the method may include monitoring for a second downlink communication communicated over one or more resources that occur within a time threshold after the second resource for the RO based on detecting that the CLI fails to satisfy the threshold. The operations of 1820 may be performed in accordance with examples as disclosed herein. In some examples, aspects of the operations of 1820 may be performed by a downlink communications monitoring component 850 as described with reference to FIG. 8.

At 1825, the method may include transmitting, to the base station over a third resource, an indication of CLI between a RACH message transmitted over the second resource and the downlink communication received from the base station. The operations of 1825 may be performed in accordance with examples as disclosed herein. In some examples, aspects of the operations of 1825 may be performed by an interference manager 835 as described with reference to FIG. 8.

Figure 19:
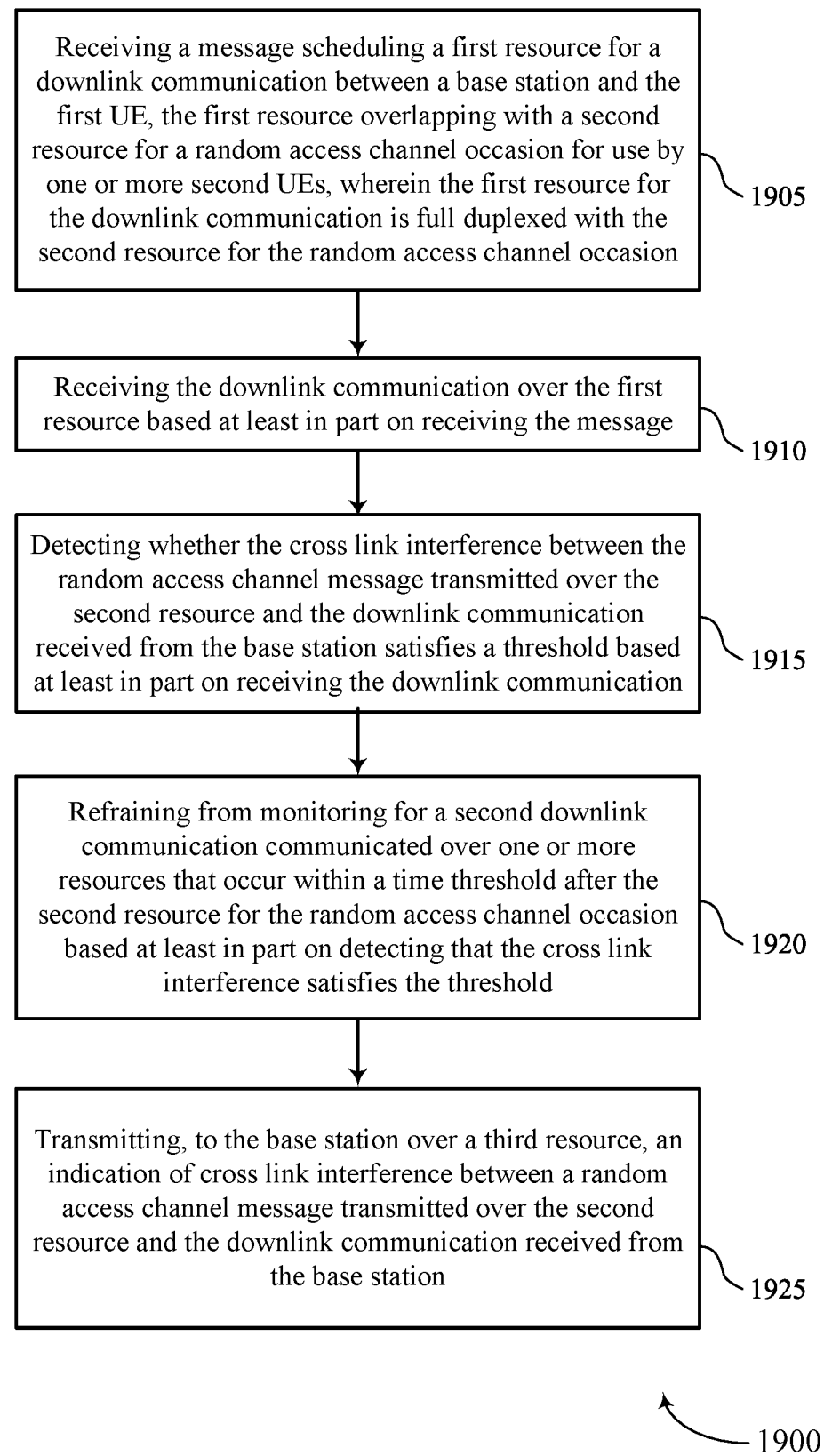

FIG. 19 shows a flowchart illustrating a method 1900 that supports ROs and resources for interference mitigation in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving a message scheduling a first resource for a downlink communication between a base station and the first UE, the first resource overlapping with a second resource for a RO for use by one or more second UEs, where the first resource for the downlink communication is full-duplexed with the second resource for the RO. The operations of 1905 may be performed in accordance with examples as disclosed herein. In some examples, aspects of the operations of 1905 may be performed by a downlink scheduling manager 825 as described with reference to FIG. 8.

At 1910, the method may include receiving the downlink communication over the first resource based on receiving the message. The operations of 1910 may be performed in accordance with examples as disclosed herein. In some examples, aspects of the operations of 1910 may be performed by a downlink communications component 830 as described with reference to FIG. 8.

At 1915, the method may include detecting whether the CLI between the RACH message transmitted over the second resource and the downlink communication received from the base station satisfies a threshold based on receiving the downlink communication, where transmitting the indication is based on determining whether the CLI satisfies the threshold. The operations of 1915 may be performed in accordance with examples as disclosed herein. In some examples, aspects of the operations of 1915 may be performed by a threshold manager 845 as described with reference to FIG. 8.

At 1920, the method may include refraining from monitoring for a second downlink communication communicated over one or more resources that occur within a time threshold after the second resource for the RO based on detecting that the CLI satisfies the threshold. The operations of 1920 may be performed in accordance with examples as disclosed herein. In some examples, aspects of the operations of 1920 may be performed by a downlink communications monitoring component 850 as described with reference to FIG. 8.

At 1925, the method may include transmitting, to the base station over a third resource, an indication of CLI between a RACH message transmitted over the second resource and the downlink communication received from the base station. The operations of 1925 may be performed in accordance with examples as disclosed herein. In some examples, aspects of the operations of 1925 may be performed by an interference manager 835 as described with reference to FIG. 8.

Figure 20:
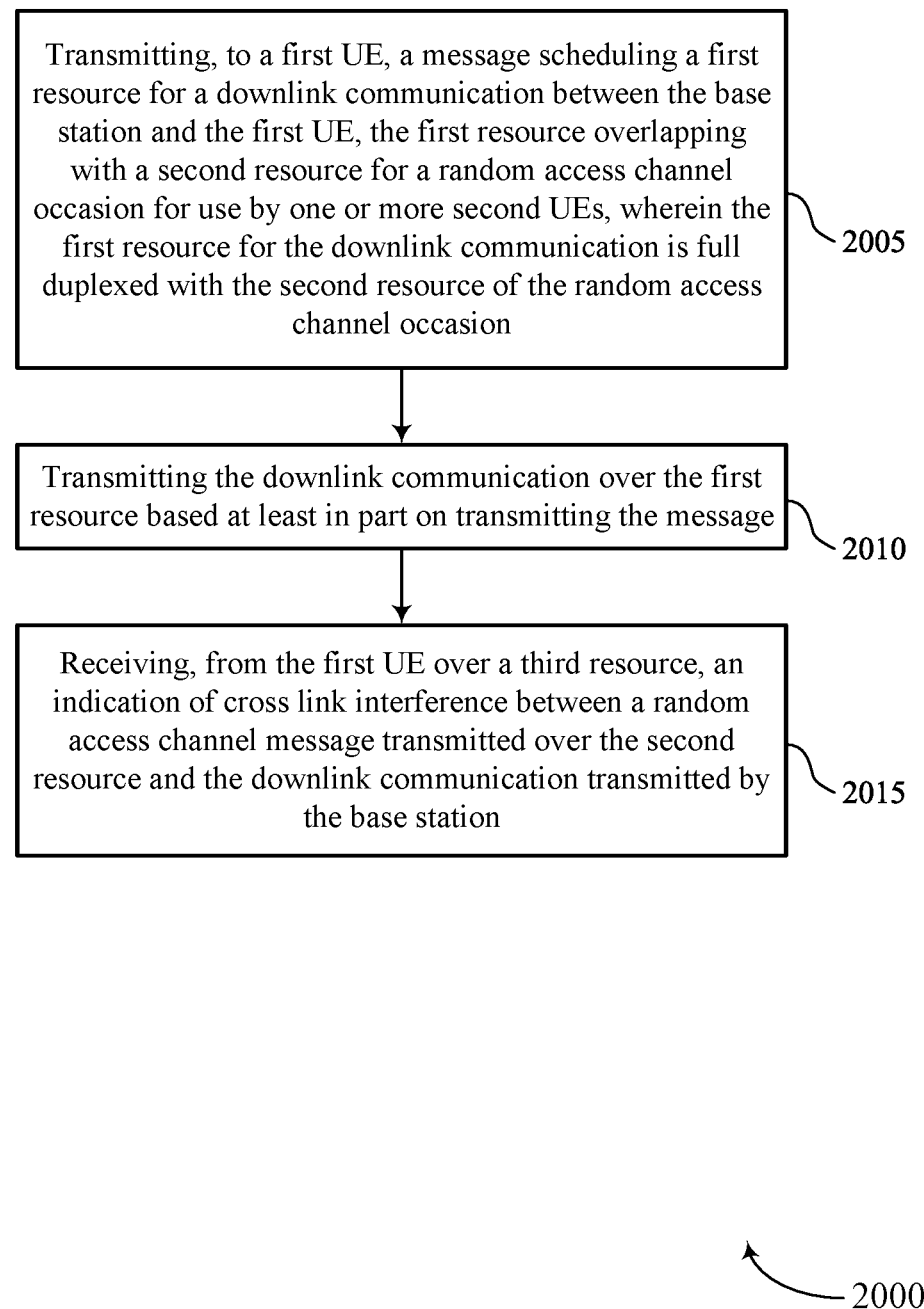

FIG. 20 shows a flowchart illustrating a method 2000 that supports ROs and resources for interference mitigation in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The operations of 2005 may be performed in accordance with examples as disclosed herein. In some examples, aspects of the operations of 2005 may be performed by a downlink scheduling component 1225 as described with reference to FIG. 12.

At 2010, the method may include transmitting the downlink communication over the first resource based on transmitting the message. The operations of 2010 may be performed in accordance with examples as disclosed herein. In some examples, aspects of the operations of 2010 may be performed by a downlink communications component 1230 as described with reference to FIG. 12.

At 2015, the method may include receiving, from the first UE over a third resource, an indication of CLI between a RACH message transmitted over the second resource and the downlink communication transmitted by the base station. The operations of 2015 may be performed in accordance with examples as disclosed herein. In some examples, aspects of the operations of 2015 may be performed by an interference component 1235 as described with reference to FIG. 12.

Figure 21:
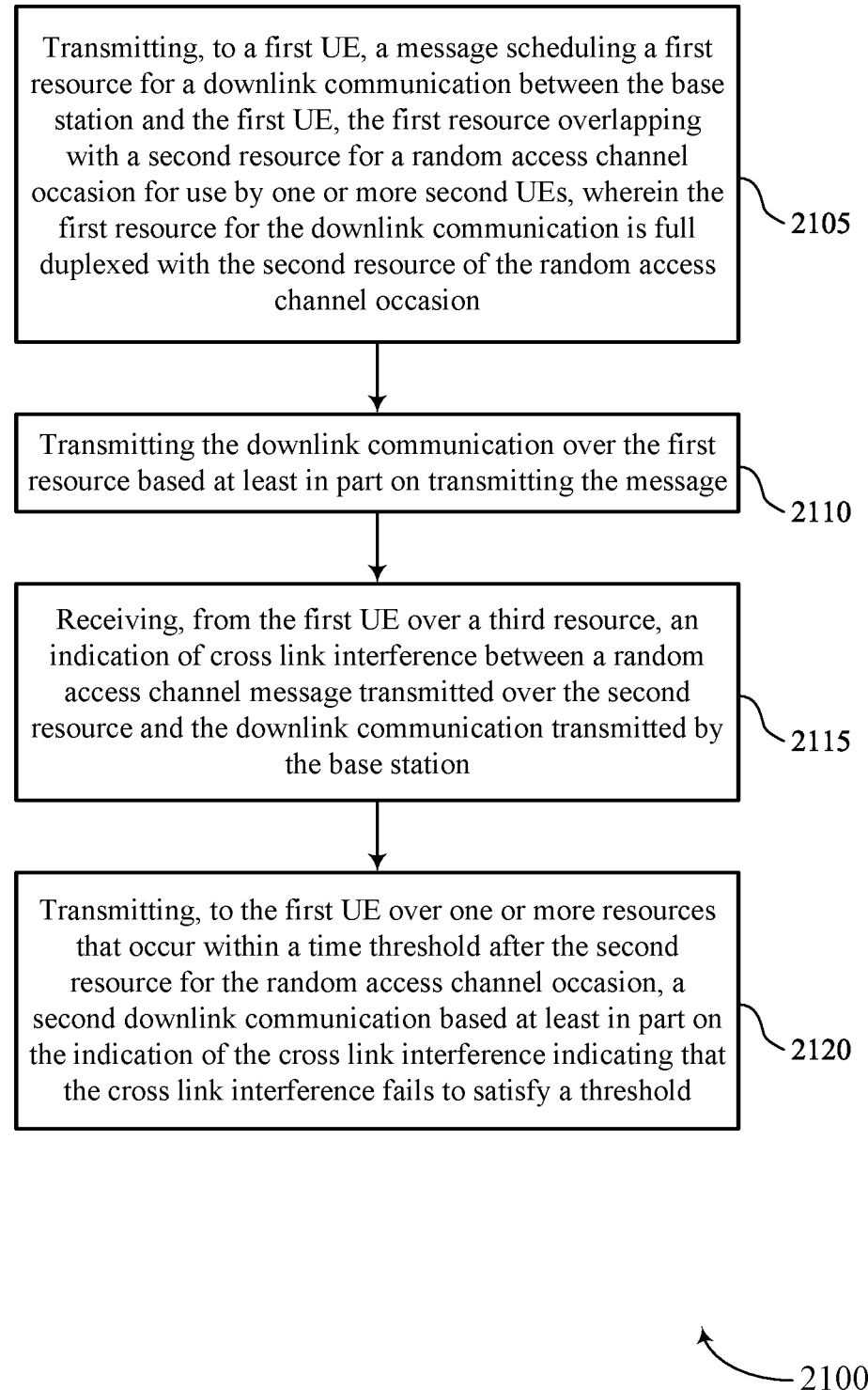

FIG. 21 shows a flowchart illustrating a method 2100 that supports ROs and resources for interference mitigation in accordance with aspects of the present disclosure. The operations of the method 2100 may be implemented by a base station or its components as described herein. For example, the operations of the method 2100 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2105, the method may include transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The operations of 2105 may be performed in accordance with examples as disclosed herein. In some examples, aspects of the operations of 2105 may be performed by a downlink scheduling component 1225 as described with reference to FIG. 12.

At 2110, the method may include transmitting the downlink communication over the first resource based on transmitting the message. The operations of 2110 may be performed in accordance with examples as disclosed herein. In some examples, aspects of the operations of 2110 may be performed by a downlink communications component 1230 as described with reference to FIG. 12.

At 2115, the method may include receiving, from the first UE over a third resource, an indication of CLI between a RACH message transmitted over the second resource and the downlink communication transmitted by the base station. The operations of 2115 may be performed in accordance with examples as disclosed herein. In some examples, aspects of the operations of 2115 may be performed by an interference component 1235 as described with reference to FIG. 12.

At 2120, the method may include transmitting, to the first UE over one or more resources that occur within a time threshold after the second resource for the RO, a second downlink communication based on the indication of the CLI indicating that the CLI fails to satisfy a threshold. The operations of 2120 may be performed in accordance with examples as disclosed herein. In some examples, aspects of the operations of 2120 may be performed by a downlink communications component 1230 as described with reference to FIG. 12.

Figure 22:
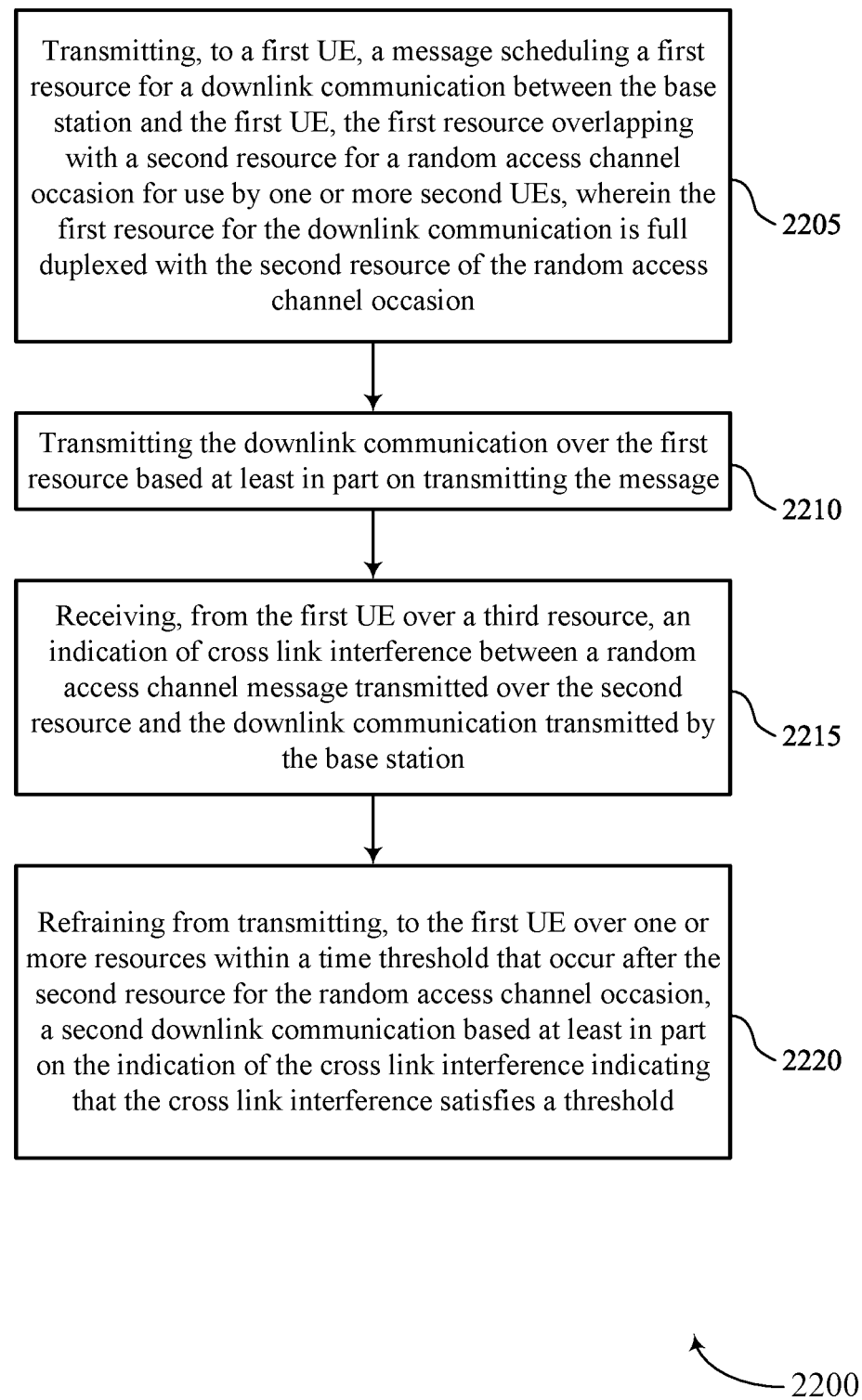

FIG. 22 shows a flowchart illustrating a method 2200 that supports ROs and resources for interference mitigation in accordance with aspects of the present disclosure. The operations of the method 2200 may be implemented by a base station or its components as described herein. For example, the operations of the method 2200 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2205, the method may include transmitting, to a first UE, a message scheduling a first resource for a downlink communication between the base station and the first UE, the first resource overlapping with a second resource for a RO for use by one or more second UEs, where the first resource for the downlink communication is full-duplexed with the second resource of the RO. The operations of 2205 may be performed in accordance with examples as disclosed herein. In some examples, aspects of the operations of 2205 may be performed by a downlink scheduling component 1225 as described with reference to FIG. 12.

At 2210, the method may include transmitting the downlink communication over the first resource based on transmitting the message. The operations of 2210 may be performed in accordance with examples as disclosed herein. In some examples, aspects of the operations of 2210 may be performed by a downlink communications component 1230 as described with reference to FIG. 12.

At 2215, the method may include receiving, from the first UE over a third resource, an indication of CLI between a RACH message transmitted over the second resource and the downlink communication transmitted by the base station. The operations of 2215 may be performed in accordance with examples as disclosed herein. In some examples, aspects of the operations of 2215 may be performed by an interference component 1235 as described with reference to FIG. 12.

At 2220, the method may include refraining from transmitting, to the first UE over one or more resources within a time threshold that occur after the second resource for the RO, a second downlink communication based on the indication of the CLI indicating that the CLI satisfies a threshold. The operations of 2220 may be performed in accordance with examples as disclosed herein. In some examples, aspects of the operations of 2220 may be performed by a downlink communications component 1230 as described with reference to FIG. 12.

The following provides an overview of aspects of the present disclosure:

Aspect 1: A method for wireless communication at a first UE, comprising: receiving a message scheduling a first resource for a downlink communication between a base station and the first UE, the first resource overlapping with a second resource for a random access channel occasion for use by one or more second UEs; receiving the downlink communication over the first resource based at least in part on receiving the message; transmitting, over a third resource, an indication of cross link interference between a random access channel message transmitted over the second resource and the downlink communication communicated to at least one UE of the one or more second UEs; and receiving a second downlink communication over a fourth resource based at least in part on transmitting the indication.

Aspect 2: The method of aspect 1, wherein the first resource for the downlink communication is full duplexed with the second resource of the random access channel occasion.

Aspect 3: The method of any of aspects 1 through 2, further comprising: detecting that the cross link interference between the random access channel message transmitted over the second resource and the downlink communication communicated to the at least one UE of the one or more second UEs satisfies a threshold, wherein transmitting the indication is based at least in part on detecting that the cross link interference satisfies the threshold.

Aspect 4: The method of any of aspects 1 through 3, further comprising: receiving, as part of the message, a second indication of the third resource used to transmit the indication, wherein transmitting the indication is based at least in part on receiving the second indication of the third resource.

Aspect 5: The method of any of aspects 1 through 4, further comprising: identifying a second UE of the one or more second UEs that is causing the cross link interference with the downlink communication, wherein the indication is transmitted to the second UE based at least in part on identifying the second UE.

Aspect 6: The method of any of aspects 1 through 5, wherein the indication of the cross link interference causes a second UE of the one or more second UEs to refrain from communicating over at least one instance of the random access channel occasion that occurs within a time threshold after the second resource for the random access channel occasion.

Aspect 7: The method of any of aspects 1 through 6, wherein the cross link interference is interference caused by a full duplex configuration between the downlink communication and an uplink communication transmitted over the random access channel occasion.

Aspect 8: The method of any of aspects 1 through 7, wherein the indication includes a destination UE identifier associated with the one or more second UEs.

Aspect 9: The method of any of aspects 1 through 8, wherein the third resource is configured for downlink communications with a high-priority.

Aspect 10: The method of any of aspects 1 through 9, wherein the third resource comprises a sidelink communication resource.

Aspect 11: The method of any of aspects 1 through 10, wherein the third resource corresponds to a first communication beam and a second third resource corresponds to a second communication beam.

Aspect 12: A method for wireless communication at a first UE, comprising: receiving a message scheduling a first resource for a downlink communication between a base station and the first UE, the first resource overlapping with a second resource for a random access channel occasion for use by one or more second UEs, wherein the first resource for the downlink communication is full duplexed with the second resource for the random access channel occasion; receiving the downlink communication over the first resource based at least in part on receiving the message; transmitting, to the base station over a third resource, an indication of cross link interference between a random access channel message transmitted over the second resource and the downlink communication received from the base station.

Aspect 13: The method of aspect 12, further comprising: detecting whether the cross link interference between the random access channel message transmitted over the second resource and the downlink communication received from the base station satisfies a threshold based at least in part on receiving the downlink communication, wherein transmitting the indication is based at least in part on determining whether the cross link interference satisfies the threshold.

Aspect 14: The method of aspect 13, further comprising: monitoring for a second downlink communication communicated over one or more resources that occur within a time threshold after the second resource for the random access channel occasion based at least in part on detecting that the cross link interference fails to satisfy the threshold.

Aspect 15: The method of any of aspects 13 through 14, further comprising: refraining from monitoring for a second downlink communication communicated over one or more resources that occur within a time threshold after the second resource for the random access channel occasion based at least in part on detecting that the cross link interference satisfies the threshold.

Aspect 16: The method of any of aspects 12 through 15, further comprising: receiving a second indication from the base station to refrain from monitoring for a second downlink communication communicated over one or more resources that occur within a time threshold after the second resource for the random access channel occasion based at least in part on transmitting the second indication.

Aspect 17: The method of any of aspects 12 through 16, further comprising: receiving, as part of the indication, a second indication of the third resource used to communicate the second indication of the cross link interference.

Aspect 18: The method of any of aspects 12 through 17, wherein the indication is transmitted via PUCCH, the PUCCH comprises a feedback indication or a scheduling request, or both.

Aspect 19: A method for wireless communication at a base station, comprising: transmitting, to a first UE, a message scheduling a first resource for a downlink communication between the base station and the first UE, the first resource overlapping with a second resource for a random access channel occasion for use by one or more second UEs, wherein the first resource for the downlink communication is full duplexed with the second resource of the random access channel occasion; transmitting the downlink communication over the first resource based at least in part on transmitting the message; receiving, from the first UE over a third resource, an indication of cross link interference between a random access channel message transmitted over the second resource and the downlink communication transmitted by the base station.

Aspect 20: The method of aspect 19, further comprising: transmitting, to the first UE over one or more resources that occur within a time threshold after the second resource for the random access channel occasion, a second downlink communication based at least in part on the indication of the cross link interference indicating that the cross link interference fails to satisfy a threshold.

Aspect 21: The method of any of aspects 19 through 20, further comprising: refraining from transmitting, to the first UE over one or more resources within a time threshold that occur after the second resource for the random access channel occasion, a second downlink communication based at least in part on the indication of the cross link interference indicating that the cross link interference satisfies a threshold.

Aspect 22: The method of any of aspects 19 through 21, further comprising: transmitting a second indication to indicate to the first UE to refrain from monitoring for a second downlink communication communicated over one or more resources that occur within a time threshold after the second resource for the random access channel occasion based at least in part on receiving the indication.

Aspect 23: The method of any of aspects 19 through 22, further comprising: transmitting, as part of the message, a second indication of the third resource used to communicate the indication of the cross link interference.

Aspect 24: The method of any of aspects 19 through 23, wherein the indication is received via PUCCH, the PUCCH comprises a feedback indication or a scheduling request, or both.

Aspect 25: An apparatus for wireless communication at a first UE, comprising a processor; memory coupled with the processor; and instructions stored in the memory and executable by the processor to cause the apparatus to perform a method of any of aspects 1 through 11.

Aspect 26: An apparatus for wireless communication at a first UE, comprising at least one means for performing a method of any of aspects 1 through 11.

Aspect 27: A non-transitory computer-readable medium storing code for wireless communication at a first UE, the code comprising instructions executable by a processor to perform a method of any of aspects 1 through 11.

Aspect 28: An apparatus for wireless communication at a first UE, comprising a processor; memory coupled with the processor; and instructions stored in the memory and executable by the processor to cause the apparatus to perform a method of any of aspects 12 through 18.

Aspect 29: An apparatus for wireless communication at a first UE, comprising at least one means for performing a method of any of aspects 12 through 18.

Aspect 30: A non-transitory computer-readable medium storing code for wireless communication at a first UE, the code comprising instructions executable by a processor to perform a method of any of aspects 12 through 18.

Aspect 31: An apparatus for wireless communication at a base station, comprising a processor; memory coupled with the processor; and instructions stored in the memory and executable by the processor to cause the apparatus to perform a method of any of aspects 19 through 24.

Aspect 32: An apparatus for wireless communication at a base station, comprising at least one means for performing a method of any of aspects 19 through 24.

Aspect 33: A non-transitory computer-readable medium storing code for wireless communication at a base station, the code comprising instructions executable by a processor to perform a method of any of aspects 19 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving a message scheduling a first resource for a first downlink communication between a base station and the first UE, the first resource overlapping with a second resource for a random access channel occasion for use by one or more second UEs;
   receiving the first downlink communication over the first resource based at least in part on receiving the message;
   identifying a second UE of the one or more second UEs that is causing cross link interference between a random access channel message transmitted over the second resource and the first downlink communication;
   transmitting, over a third resource and based at least in part on identifying the second UE, an indication of the cross link interference between the random access channel message transmitted over the second resource and the first downlink communication, wherein the indication is transmitted to the second UE based at least in part on identifying the second UE; and
   receiving a second downlink communication over a fourth resource based at least in part on transmitting the indication of the cross link interference.

2. The method of claim 1, wherein the first resource for the first downlink communication is full-duplexed with the second resource of the random access channel occasion.

3. The method of claim 1, further comprising:
   detecting that the cross link interference between the random access channel message transmitted over the second resource and the first downlink communication satisfies a threshold, wherein transmitting the indication of the cross link interference is based at least in part on detecting that the cross link interference satisfies the threshold.

4. The method of claim 1, further comprising:
   receiving, as part of the message, a second indication of the third resource used to transmit the indication of the cross link interference, wherein transmitting the indication of the cross link interference is based at least in part on receiving the second indication of the third resource.

5. The method of claim 1, wherein the indication of the cross link interference causes the second UE to refrain from communicating over at least one instance of the random access channel occasion that occurs within a time threshold after the second resource for the random access channel occasion.

6. The method of claim 1, wherein the cross link interference is interference caused by a full-duplex configuration between the first downlink communication and an uplink communication transmitted over the random access channel occasion.

7. The method of claim 1, wherein the indication of the cross link interference includes a destination UE identifier associated with the one or more second UEs.

8. The method of claim 1, wherein the third resource is configured for downlink communications with a high-priority.

9. The method of claim 1, wherein the third resource comprises a sidelink communication resource.

10. The method of claim 1, wherein the third resource corresponds to a first communication beam and a second third resource corresponds to a second communication beam.

11. A method for wireless communication at a first user equipment (UE), comprising:
    receiving a message scheduling a first resource for a first downlink communication between a base station and the first UE, the first resource overlapping with a second resource for a random access channel occasion for use by one or more second UEs, wherein the first resource for the first downlink communication is full-duplexed with the second resource for the random access channel occasion;
    receiving the first downlink communication over the first resource based at least in part on receiving the message;
    monitoring, based at least in part on detecting that cross link interference between a random access channel message transmitted over the second resource and the first downlink communication fails to satisfy a threshold, for a second downlink communication communicated over one or more resources that occur within a time threshold after the second resource; and
    transmitting, to the base station, over a third resource, and based at least in part on the cross link interference failing to satisfy the threshold, an indication of the cross link interference between the random access channel message transmitted over the second resource and the first downlink communication.

12. The method of claim 11, further comprising:
    receiving, as part of the message, a second indication of the third resource used to communicate the indication of the cross link interference.

13. The method of claim 11, wherein:
    the indication of the cross link interference is transmitted via physical uplink control channel (PUCCH), and
    the PUCCH comprises a feedback indication or a scheduling request, or both.

14. A method for wireless communication at a base station, comprising:
- transmitting, to a first user equipment (UE), a message scheduling a first resource for a first downlink communication between the base station and the first UE, the first resource overlapping with a second resource for a random access channel occasion for use by one or more second UEs, wherein the first resource for the first downlink communication is full-duplexed with the second resource of the random access channel occasion;
- transmitting the first downlink communication over the first resource based at least in part on transmitting the message;
- receiving, from the first UE over a third resource, an indication of cross link interference between a random access channel message transmitted over the second resource and the first downlink communication transmitted by the base station; and
- transmitting, to the first UE, over one or more resources that occur within a time threshold after the second resource for the random access channel occasion, and based at least in part on the indication of the cross link interference indicating that the cross link interference fails to satisfy a threshold, a second downlink communication.

15. The method of claim 14, further comprising:
- transmitting, based at least in part on receiving the indication of the cross link interference, a second indication to the first UE to indicate for the first UE to refrain from monitoring for the second downlink communication communicated over the one or more resources that occur within the time threshold after the second resource for the random access channel occasion.

16. The method of claim 14, further comprising:
- transmitting, as part of the message, a third indication of the third resource used to communicate the indication of the cross link interference.

17. The method of claim 14, wherein:
- the indication of the cross link interference is received via physical uplink control channel (PUCCH), and
- the PUCCH comprises a feedback indication or a scheduling request, or both.

18. An apparatus for wireless communication at a first user equipment (UE), comprising:
- a processor; and
- a memory coupled with the processor, wherein the memory comprises instructions executable by the processor to cause the apparatus to:
  - receive a message scheduling a first resource for a first downlink communication between a base station and the first UE, the first resource overlapping with a second resource for a random access channel occasion for use by one or more second UEs;
  - receive the first downlink communication over the first resource based at least in part on receiving the message;
  - identify a second UE of the one or more second UEs that causes cross link interference between a random access channel message transmitted over the second resource and the first downlink communication;
  - transmit, over a third resource and based at least in part on identification of the second UE, an indication of the cross link interference between the random access channel message transmitted over the second resource and the downlink communication, wherein the indication is transmitted to the second UE based at least in part on the identification of the second UE; and
  - receive a second downlink communication over a fourth resource based at least in part on transmitting the indication of the cross link interference.

19. The apparatus of claim 18, wherein the first resource for the first downlink communication is full-duplexed with the second resource of the random access channel occasion.

20. The apparatus of claim 18, wherein the instructions are further executable by the processor to cause the apparatus to:
- detect that the cross link interference between the random access channel message transmitted over the second resource and the first downlink communication satisfies a threshold, wherein transmitting the indication of the cross link interference is based at least in part on detecting that the cross link interference satisfies the threshold.

21. The apparatus of claim 18, wherein the instructions are further executable by the processor to cause the apparatus to:
- receive, as part of the message, a second indication of the third resource used to transmit the indication of the cross link interference, wherein transmitting the indication of the cross link interference is based at least in part on receiving the second indication of the third resource.

22. The apparatus of claim 18, wherein the indication of the cross link interference causes the second UE to refrain from communicating over at least one instance of the random access channel occasion that occurs within a time threshold after the second resource for the random access channel occasion.

23. The method of claim 11, wherein the cross link interference is interference caused by a full-duplex configuration between the first downlink communication and an uplink communication transmitted over the random access channel occasion.

24. The method of claim 11, wherein the indication of the cross link interference includes a destination UE identifier associated with the one or more second UEs.

25. The method of claim 11, wherein the third resource is configured for downlink communications with a high-priority.

26. The method of claim 11, wherein the third resource comprises a sidelink communication resource.

27. The method of claim 11, wherein the third resource corresponds to a first communication beam and a second third resource corresponds to a second communication beam.

28. The method of claim 14, wherein the cross link interference is interference caused by a full-duplex configuration between the first downlink communication and an uplink communication transmitted over the random access channel occasion.

29. The method of claim 14, wherein the indication of the cross link interference includes a destination UE identifier associated with the one or more second UEs.

* * * * *